United States Patent
Harasimiuk

(10) Patent No.: US 6,825,857 B2
(45) Date of Patent: Nov. 30, 2004

(54) IMAGE SCALING

(75) Inventor: Michal Harasimiuk, Winterbourne (GB)

(73) Assignee: Clearspeed Technology Limited, Bristol (GB)

( * ) Notice: Subject to any disclaimer, the term of this patent is extended or adjusted under 35 U.S.C. 154(b) by 318 days.

(21) Appl. No.: 10/050,880

(22) Filed: Jan. 18, 2002

(65) Prior Publication Data

US 2002/0154123 A1 Oct. 24, 2002

(30) Foreign Application Priority Data

Jan. 19, 2001 (GB) ............................................. 0101410

(51) Int. Cl.[7] ............................. G09G 5/00; G06F 15/80
(52) U.S. Cl. ..................................... 345/660; 345/505
(58) Field of Search .................. 345/660, 502, 345/505, 564, 667, 670, 671, 698; 382/260, 298, 299

(56) References Cited

U.S. PATENT DOCUMENTS

| | | | | |
|---|---|---|---|---|
| 4,972,495 A | * | 11/1990 | Blike et al. | 382/304 |
| 5,384,904 A | | 1/1995 | Sprague et al. | |
| 5,550,764 A | | 8/1996 | Mandl | |
| 5,793,379 A | | 8/1998 | Lapidous | |
| 5,796,879 A | * | 8/1998 | Wong et al. | 382/300 |
| 5,825,367 A | | 10/1998 | Shyu et al. | |
| 5,847,714 A | * | 12/1998 | Naqvi et al. | 345/668 |
| 5,977,947 A | * | 11/1999 | Potu | 345/660 |
| 6,104,842 A | * | 8/2000 | Rich | 382/304 |
| 6,366,292 B1 | * | 4/2002 | Allen | 345/611 |

FOREIGN PATENT DOCUMENTS

| | | |
|---|---|---|
| EP | 0079542 A2 | 5/1983 |
| EP | 0449210 A2 | 10/1991 |
| EP | 0589721 A1 | 3/1994 |
| GB | 2224410 | 5/1990 |
| JP | 10028239 | 7/1996 |

* cited by examiner

*Primary Examiner*—Kee M. Tung
*Assistant Examiner*—Aaron M. Richer
(74) *Attorney, Agent, or Firm*—Potomac Patent Group PLLC

(57) ABSTRACT

A method and a system for scaling a digital source image consisting of a grid of X by Y pixels into a target image of a different resolution comprises the steps of/tools for:

mapping the source pixels onto the target pixels;

scaling the source image in the X or Y direction to produce intermediate pixels that are scaled in one direction by determining contributions to each intermediate pixel using a digital filter and accumulating the contributions for each intermediate pixel, wherein each source pixel contributes to one or more intermediate pixels and each intermediate pixel receives contributions from one or more source pixels; and subsequently scaling the intermediate pixels in the other direction by determining the contributions to each target pixel using the filter and accumulating the contributions for each target pixel;

wherein each intermediate pixel contributes to one or more target pixels and each target pixel receives contributions from one or more intermediate pixels.

The method is preferably carried out on a PE array in an SIMD (Simple Instruction Multiple Data) device.

41 Claims, 11 Drawing Sheets

Pixel (memory) - Processing element mapping

○ Destination pixels centres
▪ Source pixel centres

— Destination pixels boundaries
— Source pixel boundaries

■ PEs allocated to accumulate the target pixel values in the fast scan direction Source / target pixel coverage Partitioning of the original image in order to increase the PE utilisation

IMAGE SCALING

FIELD OF THE INVENTION

The invention relates to the field of signal processing, with applications in computer graphics, and in particular to the 2D image processing field Broadly speaking, computer images, whether video or still images, are normally stored as pixel intensity values, usually in the form of digital information, in a succession of rows of pixel intensity values.

The invention relates particularly to image scaling of a digital image, for example, to produce a different output format and/or size and has many industrial applications, for example in real-time manipulation of an on-screen image (for instance to allow resizing in an arbitrary sized window) or transferring images to different output formats. The invention is particularly suitable for applications in video, broadcasting and HDTV.

DESCRIPTION OF THE PRIOR ART

The process of scaling an image generally consists of three steps: reading or capturing the input data, performing the transformation (by sampling and any necessary corrections) and storing the resultant image.

For an analogue input, a pixel representation of the image is usually obtained by sampling a continuous input signal associated with a real object (the signal could be an analogue output of a video camera or a mathematical representation of an object) at a specific sampling rate. This allows conversion of the continuous (analogue) signal into its discrete (digital) representation. Digital input signals may also be resampled further (possibly with a different sampling rate) to change the size and/or resolution of the images which they represent.

The problems of scaling an analogue or digital image can be perceived in the broader context of signal processing theory. The sampling procedure may lead to a loss of information contained in the image. Mathematically, the minimum sampling frequency at which the input signal must be sampled in order to retain all the frequencies contained within it is twice that of the highest frequency component present in the input signal. This sampling frequency is known as the Nyquist Frequency.

If the higher frequencies are undersampled (that is, the sampling is at too low a frequency) they will be misrepresented in the output as lower harmonics; this is known as aliasing. One way to eliminate aliasing is to increase the sampling frequency. Where this is not possible, the high frequencies that will be misrepresented must be removed from the input signal. This can be achieved by performing a Fourier Transform on the input signal, limiting the frequency spectrum to up to half of the Nyquist Frequency and performing the Inverse Fourier Transform to return to the spatial domain. However, in the case of real-time systems, performing a Fourier Transform may be computationally too time consuming.

Another way of removing the high frequency components is through the use of digital filters in the spatial domain. The term "digital filter" refers to a computational process or algorithm by which a digital signal or sequence of numbers (acting as an input) is transformed into a second sequence of numbers termed the output digital signal. There are two broad classes of such filters: Infinite Impulse Response (IIR) and Finite Impulse Response (FIR) filters. Both are well known.

In digital image scaling the general purpose of an FIR filter is to work out a weighted sum of contributions from source pixels to a target pixel.

The output of an FIR filter can be defined by the convolution of the filtering function (P) with the signal intensity function (I):

$$\xi(x) = \sum_{t=-Fw_{1/2}}^{Fw_{1/2}} I(x-t) \cdot F(t) dt,$$

where $Fw_{1/2}$ represents half of the filter width expressed in pixel units. A convention may be adopted in which the filter is centred on the midpoint of the central pixel of its support range (the pixels it filters) and the total filter width Fw is therefore given as $2.Fw_{1/2}+1$ (pixels). However, other conventions are equally valid.

Digital image scaling may be defined as (re)sampling of an input digital signal representing a digital image, possibly using a different sampling frequency from the original frequency to give a different resolution. The target may be smaller or larger than the original (or source) image and/or have a different aspect ratio. Downscaling (reduction of image size) gives a smaller target than source image and upscaling (increase of image size) gives a larger size.

There are many scaling methods available. The simplest and fastest scaling method is probably the pixel decimation/replication technique. Here, some of the original sampled pixels are simply omitted for downscaling and replicated for upscaling. The image quality produced is, however, often poor. Additional measures aimed at improving the image quality, such as replicating original samples prior to resampling, are often employed (U.S. Pat. No. 5,825,367). A possible problem with this approach is that it not only ignores any frequency consideration, which leads to presence of aliasing, but it also introduces other artifacts (image distortions) such as unwanted, often jagged lines and/or large blocks of equally coloured pixels in the image.

Partial improvement may be achieved through interpolation. In this technique, broadly speaking, rather than replicating source pixels to arrive at the additional pixel values during upscaling, there is interpolation between the values of two or more source pixel values (for example using higher-order polynomial interpolation). While aliasing artifacts are still likely to be present, the overall image quality is improved and the image is smoothed. Such smoothing may lead to a loss of contrast and the interpolated images often look blurry (U.S. Pat. No. 5,793,379). There are a number of possible refinements to interpolation in its simplest one-dimensional form. Probably the most advanced of these is three-dimensional interpolation as described, for example, in U.S. Pat. No. 5,384,904.

All the above approaches suffer from the same basic drawback: they do not provide high frequency adjustments and thus inevitably lead to the introduction of aliasing (and therefore artifacts).

As explained in previous paragraphs, the application of FIR filters removes this problem to some extent. However, although not always as computationally expensive as the Fourier transform, FIR filters still pose serious challenges for use in real-time environments. When implemented in hardware, FIR filters tend to occupy a large area of silicon in order to ensure that a sufficiently large number of sample points, or filter taps, is taken into account for computation. The FIR filter computes the value of the convolution of the filtering and the image intensity functions. The larger the number of sample points, the sharper the frequency cut-off of a filter and the smaller the spectrum of offending high frequencies passing through the filter. The number of points at which the convolution (i.e. the number of filter taps) has to be evaluated increases with the scaling ratio. Thus there is a threshold value above which the number of input pixels required for filter support exceeds the number of the taps available in silicon. To allow for higher scaling ratios, some method of limiting the number of input points or simulating wider filters using narrower ones must be implemented. An example of such an implementation, using decimating filters, can be found in U.S. Pat. No. 5,550,764. Unfortunately, as with all decimation, some of the input information is discarded and the quality of the output is thus degraded.

Software implementations do not exhibit these constraints, but due to potentially large amounts of input data required for generating a single output pixel, the performance of such implementations sometimes renders them unsuitable for real time processing.

The present invention aims to overcome or mitigate at least some of the disadvantages inherent in the prior art.

According to a first aspect of the invention there is provided a parallel processing method and system for scaling a digital source image consisting of a matrix of X by Y pixels into a target image of a different resolution, comprising the steps of:

mapping the higher resolution pixels onto the lower resolution pixels; scaling the source image in the X or Y direction to produce intermediate pixels that are scaled in one direction by determining contributions to each intermediate pixel using a suitable digital filter function and accumulating (or summing) the contributions for each intermediate pixel, wherein each source pixel contributes to one or more intermediate pixels and each intermediate pixel receives contributions from one or more source pixels; and subsequently scaling the intermediate pixels in the other direction by determining the contributions to each target pixel using the filter function and accumulating the contributions for each target pixel; wherein each intermediate pixel contributes to one or more target pixels and each target pixel receives contributions from one or more intermediate pixels.

The system and method according to embodiments of the invention seek to improve on the prior-art methods for digital scaling. Parallel processing of the source/intermediate pixels (which may be of up to one entire line) allows a real-time process with faster production of the target image. The present invention can be implemented using an FIR filter implemented in software on a SIMD (Single Instruction Multiple Data) processing array in which each PE (processing element of the array)receives the same instruction to parallel process the pixels. Such an arrangement possesses a high level of flexibility and adaptability while exceeding the performance of typical dedicated hardware implementations Alternative parallel processing systems may also be used. Each source pixel or intermediate (hereinafter source pixel for brevity) contributes to the target image and usually to more than one target pixel. This avoids any decimation with the attendant disadvantages.

The present invention provides a high performance and high quality method for scaling images on a SIMD computing device. Additional advantageous features, in particular relating to suitable methods for feeding data into and out of the SIMD processing array are presented in the method as detailed below.

The system may be in the form of hardware and/or software with suitable tools, such as apparatus, circuitry, and/or code structures to carry out the method defined above. It may further comprise additional tools to carry out the further method steps as detailed below.

Reference herein to a matrix is to any two dimensional array of pixels, such as a grid or a skewed grid or other two-dimensional array.

Reference herein to the X direction is generally to the direction across the screen, conventionally to the right along the lines (or viewing screen) and reference to the Y direction is generally to the "column" direction down the lines (or screen). However, any suitable X and Y directions (preferably at right angles) may be used to correspond to the array of digital information which represents the pixels.

Reference herein to parallel processing is to processing in which more than one pixel value is processed simultaneously. In many cases, an entire line or column of values may be processed simultaneously.

Reference herein to mapping is to determining the spatial correspondence between images, usually between the higher and lower resolution pixels. Reference to resolution is to the number of pixels of the pixel grid forming an image. The more pixels making up an image, the higher the resolution.

Reference herein to scaling is to changing the aspect ratio of the image and/or the resolution of the image, this latter so that the resultant number of pixels in the target image is smaller (lower resolution) or larger (higher resolution) than in the source image. If the source and target images are displayed with pixels of the same size, the higher resolution image will be larger.

Reference herein to a digital filter or digital filter function is to the overall computational process or algorithm by which a digital signal or set of pixel values is transformed into a second set of numbers. This process preferably includes an integration/convolution function.

The method preferably includes the step of mapping a cluster of the higher-resolution pixels of one image onto each of the lower-resolution pixels of the other image. The cluster may be mapped in one or both directions. A cluster may be defined as all the higher-resolution pixels falling within the footprint of a lower-resolution pixel. This correspondence can be seen, for example, when the two images and their respective pixel boundaries are superimposed, with the actual measurements of the images being identical. The higher resolution image will be made up of more pixels (within the same space) than the lower resolution image.

In one embodiment a higher resolution pixel belongs to the cluster of a lower resolution pixel if the midpoint (or centre) of the higher resolution pixel considered falls within (the footprint of) that lower resolution pixel.

This cluster feature is particularly applicable in downscaling, when the digital filter is combined with a cluster mapping step. Cluster mapping allows simplified computational processes, in that pixel correspondence in the X and/or Y directions is easily determined. This has a particular advantage in the X direction that, once the X clusterisation has been defined along the first line, it does not vary as the process continues to further lines.

Advantageously, the method includes the step of calculating the distance between the centre of each higher resolution pixel and the centre of each lower resolution pixel to which it contributes, or from which it receives contributions in the X and Y directions. The filter function may then be applied to give a filter factor (or filter function value). The filter factor is subsequently multiplied by the pixel intensity to give a contribution to a final convolution value for a target pixel. The final convolution value is the sum of all the contributions. Thus the contribution that each pixel makes is determined by its distance from the centre of the lower resolution pixels as well as its intensity.

Preferably, the filter factors are determined for the X direction prior to reading scanlines. These values do not change for subsequent lines: the jth source pixel along a line will always have the same filter function applied to it.

Preferably, the method also comprises the step of calculating the distance from the cluster boundary of the source (or intermediate) pixels as they are read in and defining a process change or increment to occur when the cluster border is crossed. This is particularly appropriate for the Y direction. Process increments may be, for example, application of the digital filter function in its next position, to give the next filter support range in source space (source pixels to which the digital filter is applied).

Advantageously, the filter function is evaluated analytically, to obtain contributions to the target pixels; that is, without approximation of the integration. This is particularly appropriate for parallel processing, in which computation cost may be lower.

The filter function at each position may be evaluated at any number of points suitable for the scaling required. For example, the number of points in downscaling is dependent on the spread of the filter function (or filter footprint) in source space and is known as the filter footprint number. The filter footprint number in downscaling is thus the number of source pixels in a single filter support range. Each point corresponds to a separate source or target pixel (in downscaling and upscaling respectively).

In downscaling, (and in each direction) each target pixel preferably receives contributions (from a number of source pixels) that is equal to the filter footprint number and in upscaling (and in each direction) each source pixel contributes to a number of target pixels that is equal to the filter footprint number.

The filter width is a process constant and may be defined as the filter support range in target space for downscaling and in source space for upscaling.

The number of contributions from each source pixel in downscaling and the number of contributions to each target pixel in upscaling is constant and set according to how many footprints of neighbouring filters spanned in target space (or source space respectively) overlap. This number always corresponds to the filter width In one extreme case, the filter width is one and the filter footprints do not overlap; each source pixel contributes to one target pixel only.

From the above it can be seen that the two-way contribution link between the source and target pixels preferably depends at least partially on the filter width and at least partially on the filter footprint number.

The method can be carried out on any suitable processing means, such as a programmable array of memory cells, connected workstations or serial processors with SIMD extensions. Preferably the process uses a processing element (PE) array. Each PE may include a number of memory cells which may be implemented in hardware or software. Values corresponding to pixels or combinations of pixels may be stored, and shifted between the memory cells. Preferably, the memory cells form an addressable array, such as a data queue or shift stack. The data queue is preferably of first-in first-out structure.

PE interconnections may allow data to be moved along the PE array (hereinafter swazzled). The PE interconnections may result in a 1D ring/line array or a 2D grid array. Preferably, a 1D line array is provided.

There are may possible mappings of source/target pixels onto the PEs. In a first mapping, one PE is provided per pixel of the higher resolution image. This is a simple mapping, but swazzling distances of data along the PE array to reach the target pixels may be rather long, depending on the scaling factor. Scaling may therefore be restricted to some extent because it is not possible to swazzle more than the array length. This PE-pixel mapping is preferably used with a memory cell array of the same length as the filter width.

In another embodiment, one PE is provided per pixel of the lower resolution image. This second embodiment is particularly advantageous for downscaling in the X direction and may be suitable in the case where each line of the source image has more pixels than PEs in the array. This alternative mapping has the advantage that it limits the swazzle length. In contrast to the first mapping, scaling may be arbitrary, since higher resolution pixels (for example, those in one cluster) are "squashed" into a PE of the lower resolution image. Each PB then reads and processes two or more neighbouring source pixels sequentially and writes the target pixels sequentially.

The contributions are again stored in an array of memory cells or queue, preferably of the same length as the filter width.

In downscaling, one PE per source pixel may be provided for Y scaling and one PE per target pixel in X scaling. In general however, mapping for scaling in one direction follows the mapping imposed by the scaling in the other direction.

The pixel-PE mapping may be selected automatically according to process conditions such as the scaling required and/or relative dimensions of the source of target image and PE array.

To allow real-time functioning, the method according to the present invention should be carried out in parallel (for example, on each PE in the array simultaneously). If a method step is not required for one or more PEs in the array, it is then disabled. Preferably, the parallel processing is SIMD processing.

The method may additionally include the steps of reading the source image into memory before scaling and analysing the source and target dimensions and writing the target pixels to external memory (outside the PE array) after scaling. The intermediate pixels may also be written to external memory or may be used immediately in the next (X or Y) scaling step.

In one preferred embodiment, values are shifted in the array of memory cells during Y scaling. The values may be shifted up the memory cell array (which is possibly in the form of a data queue or shift stack) when the process crosses a cluster boundary. Preferably data is swazzled between PEs for X scaling. The data may be swazzled a certain distance across a predetermined number of cluster boundaries. As with the previous features, this may apply to both up- and downscaling.

The Y scaling step thus preferably involves shifting the contents of the memory cell array by one position when a cluster boundary is crossed.

A preferred method for the Y scaling step especially suitable for downscaling includes shift and accumulation in the memory cell array. It may also include the steps of multiplying the source pixel or intermediate pixel (hereinafter source pixels) by the appropriate filter function value and then reading the resultant contributions for each source pixel into the memory cell array, adding them to any contributions from one or more lines above the present scanline which are already in the memory cell. The process may be incremented to shift the array by one position by moving the top cell value out (preferably to external memory) when a cluster border is crossed (and the top cell thus has all its contributions). The lowest contribution of the next source pixel read into the bottom cell will be the first in a new target pixel to be produced.

A preferred method for the Y scaling step especially suitable for upscaling involves only shifting (no accumulation) in the array of memory cells. It may include the steps of reading each pixel value into a cell of the array, calculating the contributions for each pixel using the filter function and summing the contributions (in a number corresponding to the filter width) for each target pixel. The method may further involve shifting the source pixels up one position, in order to read in a new source pixel and discard an old source pixel when the target boundary is crossed.

X scaling advantageously involves accumulating contributions in one accumulating PE per cluster. The contributions for each source pixel are swazzled across the PE array to their correct accumulating PE.

A preferred method for the X scaling step especially suitable for downscaling involves unidirectional swazzles. The process preferably calculates the contributions for each source pixel (preferably using the values already available from X preparation); addresses them according to the distance they must travel and stores them in an array of memory cells for each PE, then shifts each contribution in turn along the PE array to the correct accumulating PE. The addressing preferably relates to the number of cluster boundaries the contribution must cross.

A preferred method for the X scaling step especially suitable for upscaling is generally uni-directional, although some movement in the opposite direction may be required. Advantageously the method involves loading the PE array with a repeating sequence of the source pixels in the corresponding cluster. The sequence is preferably indexed to increase by one and restart each time a cluster boundary is crossed. The sequence advantageously restarts with the first pixel in the sequence. Preferably it has a length equal to the filter width. The value loaded is conveniently held in one cell of the array of memory cells. The preferred swazzle movement moves the values one step at a time along the PE array to fill a different cell with its value. This preferred method works particularly well for narrow filters, but is less advantageous in extreme circumstances (such as for very high scaling ratios).

It may be that a uni-directional swazzle will not be sufficient to fill all the cells of all the PRs (due to indexing). In this case one or more swazzle steps in the other direction may be provided to fill the empty cells. After the cells have been filled, the convolution is calculated.

According to a further aspect the invention relates to a program for carrying out the method as hereinbefore described. The program may be embodied on a carrier, such as a CD or carrier wave and may be a computer program product. Alternatively, the program may be embedded in on-chip ROM, thus becoming equivalent to a hardware part of a chip.

According to a further aspect the invention relates to a device, such as a computer or set-top box, comprising a PE array as hereinbefore described and calculating tools (in hardware or software) for carrying out the method as hereinbefore described. Further details of the device may include input tools for user parameters and connection tools to other devices. The device may further comprise tools for reading and writing image data as pixels and display means.

For a better understanding of the invention embodiments of it will now be described, by way of example, with reference to the accompanying drawings, in which.

OVERVIEW OF THE ARCHITECTURE

Image scaling requires processing of large amounts of data in a computer apparatus and/or system. According to preferred embodiments, this is achieved using a Single Instruction Multiple Data (SIMD) array of processing elements (PEs) In such an array all of the processing elements receive the same instruction stream, but operate on different data elements (in this case data associated with pixels or combinations of pixels). Such an architecture can thereby process data in parallel, but without the need to produce parallel instruction streams. A suitable SIMD architecture is disclosed in the applicant's GB 9908209.1 (Parallel Data Processing Apparatus), which is hereby incorporated by reference.

The SIMD processing array is assumed to have the function of reading the input data from the external memory to the Processing Element (PE) memory and writing cut the results of the individual ("atomic") computation performed by each of the PEs. Processing Elements are assumed to be able to exchange data between themselves (using a technique known as "swazzling"). Two interconnection networks are generally used: a 1D array/ring and a 2D grid.

Overview of the Process

Figure 1:
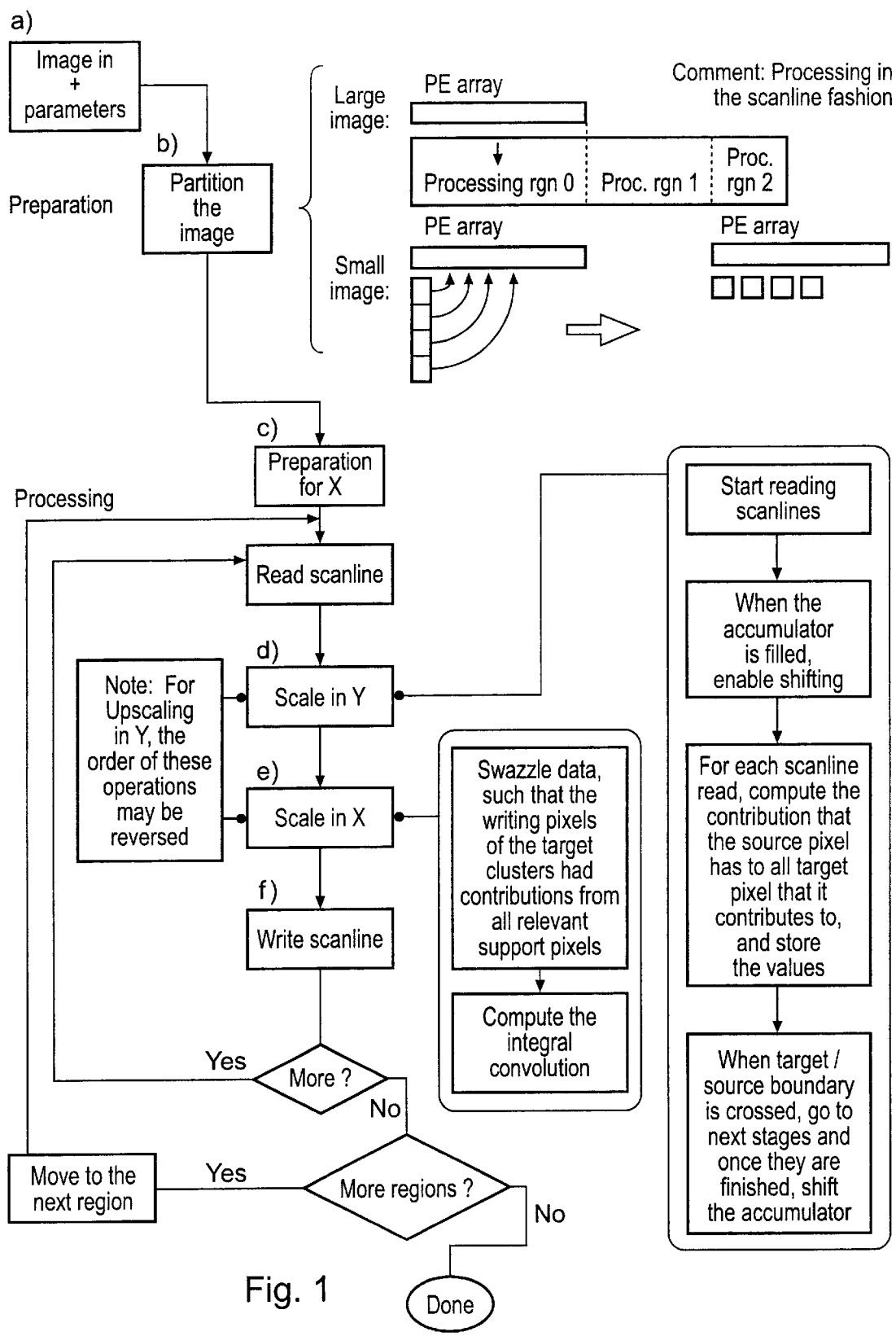
FIG. 1 is a flow chart giving an overview of the scaling process in a preferred embodiment.

FIG. 1 shows the different steps involved in the process, which will be described in greater detail in the following sections and is applicable to both downscaling and upscaling. The process is described with reference to a 1D array as an example and consists of the following steps, which generally, but not necessarily, follow the order given. The main steps are labelled (a) to (f) for ease of reference.

Firstly the image is read in and the ratio of source to target calculated (a). The source image is generally read into the PE array line by line from the top to the bottom of the image and from left to right. However, the invention may also be applied where all the source pixels are available simultaneously.

Secondly, the image may be partitioned, step (b) if applicable. Partitioning divides the image into sub-images to make it more compatible with the length of the PE array for more efficient processing.

The next step is preparation for scaling in the X direction (c), which involves mapping the pixels of the image onto PEs. There are many alternative mappings that may be suitable and the most advantageous mapping for the given application is determined by the scaling ratio. Advantageous mappings provide an optimal balance between the compute, swazzle and I/O operations. Each PE may be provided for one pixel of either the source or target image, depending on the relative numbers of the pixels in the source and target and other factors, such as architectural considerations. In one preferred embodiment a single PE is used per pixel for the larger image (measured by the number of pixels). This mapping (hereinafter the first mapping) gives a simple one to one correspondence of the PEs and the higher resolution image.

Alternatively, more than one pixel of the higher resolution image may be used per PE for reasons related to data movement (as will be explained later). This will be referred to as the alternative mapping. For example, a single PE may be used per pixel for the smaller image (in number of pixels).

In upscaling, there are, by definition, more target than source pixels and therefore the first mapping of one PE per target pixel is often used. The first mapping is usually also applied in downscaling (in this case, one PE per source pixel).

The alternative mapping (of more than one pixel of the higher resolution image per PE) is more likely to be implemented for downscaling, because the length of data movement along the PE array is shorter in the alternative mapping.

Thus, in the first pixel-PE mapping, in downscaling, values from the leftmost source pixel in each line may be allocated to the leftmost PE: the second pixel allocated to the second PE in the array and so on.

In the alternative mapping, this spatial distribution of one line of source pixels along the PE array may be replaced by an at least partially temporal distribution, in which a plurality of (usually neighbouring) source pixels in a line is sequentially fed into each PE of the array. In this alternative mapping, the array still acts in parallel, with (for example) the first PE loading the 1st source pixel, whilst the second PE loads the 5th pixel and the third loads the 9th and so on. The PEs then load their following neighbouring pixels (in this example, the first PE would load the second, third and fourth pixels). The single PE would normally correspond to a target pixel. In some cases, one line of the image will fit along the PE array, with this alternative mapping. Thus each PE will next process neighbouring pixels from the same position along the following line.

In either mapping, if one line of the image did not fit along the array, a partitioning step (b) into columns will already have been performed and the PE will next process further pixels in the sub-image, before moving onto the next sub-image.

After X preparation, the program then enters the main loop, reading scan lines and scaling first in one direction, then in the other direction. The scan lines are read into the PE array line by line from the top to the bottom of the image and left to right. Once the line has been processed (for scaling in the X direction), the next line is read into the PE array. Scaling in the Y-direction, of course, combines pixels from several source lines.

Thus, in one general case (without partitioning), each PE in the array receives a "vertical-stripe" of source pixels over time. In the first mapping, the stripe is one pixel wide and each subsequent, lower pixel is in the same position along the line. In the alternative mapping, the stripe may be viewed as more than one pixel wide and thus broader, although, of course, the source pixels have been sequentially fed into the PE to produce a single intermediate or target pixel.

Downscaling usually starts in the Y direction (d) and upscaling in the X direction (e). Scaling in both directions involves the use of a digital filter implemented in software. In each case, a target pixel receives contributions from a number of source pixels and each source pixel contributes to a (usually different) number of target pixels, as will be explained in more detail below. For example, each source pixel may contribute to three different target pixels, but each target pixel may have contributions from, say, seven source pixels.

The contribution from each contributing source pixel to a certain target pixel is calculated using the filter function. Once the source image has been scaled in one direction, the intermediate pixels produced are fed into the process for scaling in the other direction, where the filter function is used again correspondingly. Since, however, the order of X and Y scaling may be reversed, any pixels fed into a scaling process are referred to as source pixels in the following, although they may have resulted from a pre-scaling in the other direction.

The scaled scanline (or partial scanline, if there has been partitioning) is then written to memory (f), probably external memory. Once a scaled scanline has been processed, the loop progresses to the next scanline, if any. If the image has been partitioned, the loop will move to process a different sub-image, once all the scanlines in one sub-image have been written.

Downscaling

The various steps of the process will now be described in more detail with respect to downscaling.

(a) Source image reading—downscaling

The first step in the process is to read the image in and assess the parameters that define the scaling operation to find the ratio (R) in one or both directions of the source size (S) in number of pixels to the target size (T) in number of pixels:

$$R=S/T$$

This ratio, of course, determines whether the operation in that direction is to be upscaling (R<1) or downscaling (R>1).

(b) Image partitioning—downscaling

A second step, which may be applied to both upscaling and downscaling, is image partitioning as outlined above. The image must be partitioned if there are not sufficient PEs in the array to hold an entire line (of either the source or target, as will be explained in the following). This is a common situation and the PE array may be allocated to parts of the image in a number of different ways.

For example, the image may be divided along its horizontal extent into a number of blocks each with a width equal to the width of the PE array. Such an image will be processed by first mapping the PEs onto a left-most section of the lines of source pixels and then (after the block has been entirely processed) moving the mapping across to further sections of the lines by reallocating the PEs to the next group of pixels to be processed.

FIG. 2b shows the case in which the PE cannot hold all of the pixels in one line and such reallocation is applied.

In effect, partitioning of a wide image, like the alternative PE mapping described above, can be seen as temporal allocation of each source pixel line (or target pixel line in upscaling) along the array. Both temporal allocation methods may be used together.

The alternative mapping allocates neighbouring pixels to the same PE as they are being read in ("micro-allocation") whereas partitioning allocates pixels spaced one or more lengths of the PE array apart to the same PE as they are read in ("macro-allocation"). Micro-allocation happens within the line processing, whereas macro-processing treats a block including several lines and then adds the blocks together to form the final image.

Another reason for partitioning the source image is to improve utilisation of the PE array when a tall thin image is to be processed and there may be some unused PEs beyond the edge of the image, as seen in FIG. 2a. In this case it may be appropriate to divide the image along its vertical extent into blocks of equal height and read pixels starting from the top of each block into the unused sections of the PE array. This divides the image into horizontal blocks, which are later recombined to give the scaled target image.

Partitioning is not considered in the following method steps, so as not to obscure the explanation with further variables. The method steps are generally equally applicable to partitioned and non-partitioned images.

(c) X Preparation—Downscaling

After any partitioning step, X preparation is carried out for scaling in the X direction, also known as the horizontal or fast scan direction (the X direction is along the scan lines). This step maps the source pixels onto the PE array and defines the correspondence between the source pixels and target pixels. As mentioned briefly above, one PE is often provided per pixel of the source image. In the following, alternative mapping is only considered where this leads to a change in the process. In both embodiments, each pixel must receive separate (but parallel) processing.

There is also a need to establish a framework for determining which source pixels contribute to which target ones. Consider bringing the source and target images into the common frame of reference of the target image and interpreting the pixels as regions rather than points. The FIR filter support (extent) is defined with respect to the target frame, as will be explained later. Thanks to this, we have a way of describing the filter support size independently of the scale factor (in target space).

Figure 3:
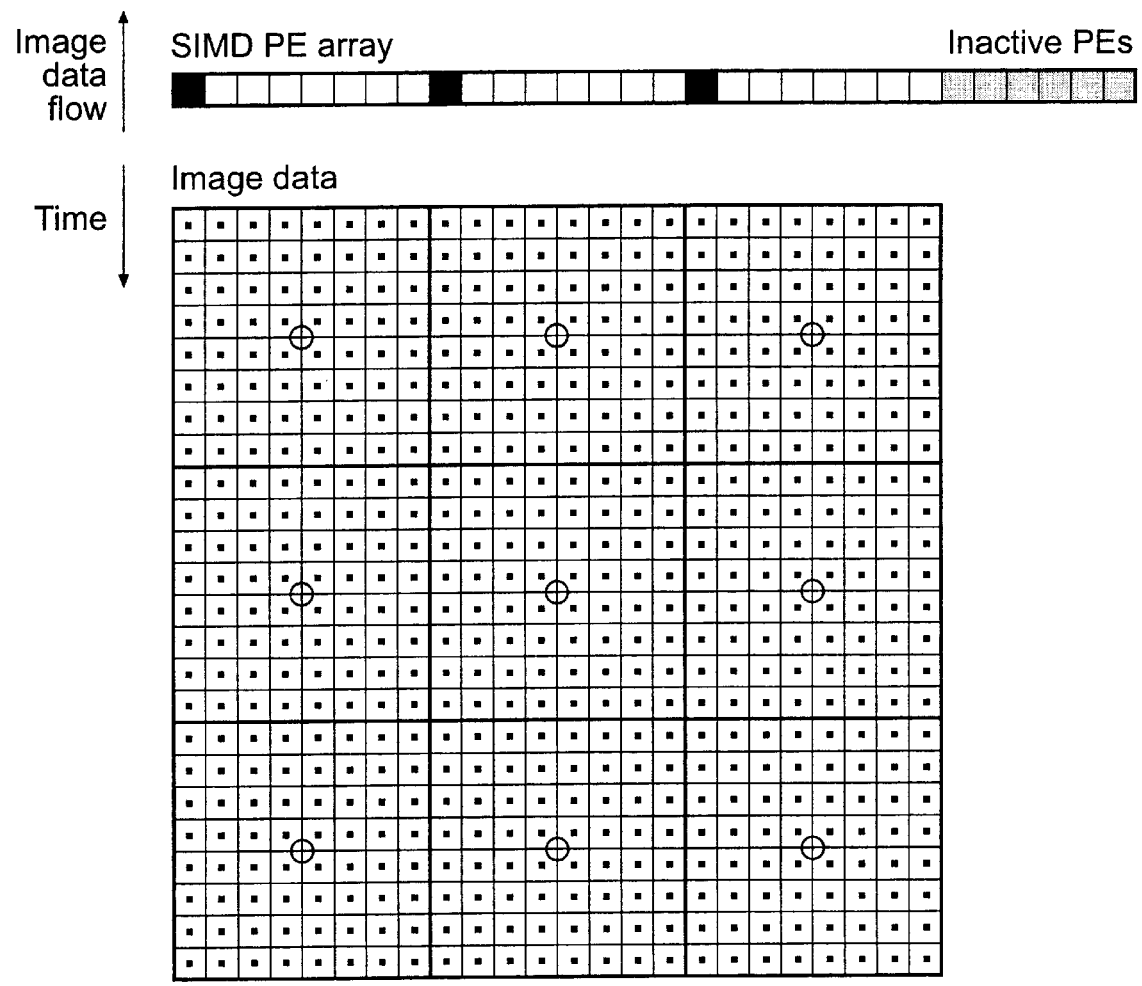
FIG. 3 is a diagram showing the mapping of source onto target pixels in relation to the PE array.

FIG. 3 shows a simplified example of the correspondence between a source image, target image and PE array. The source image (24×24 pixels) is to be compressed into the target image (3×3 pixels). The bold lines define the target pixel boundaries and each small square represents a source pixel boundary. Clearly, the target and source pixels may be of equal size in reality (so that downscaling represents a change in size of the image), but they are shown diagrammatically as different in size to demonstrate their correspondence. The target pixel may be referred to as a target cluster (of source pixel values) and its footprint covers the centres of 64 source pixels.

The PE array shown has 24 active SIMD PEs, to load one row of the source pixels at a time. One accumulation FE is allocated per target pixel (that is, 3 accumulation PEs are provided here) to accumulate the cluster of values needed to make up that pixel. In the alternative mapping, three PEs only may be used (one per target PE), each PE sequentially processing 8 source pixels.

Preparation involves mapping the PEs of the SIMD array onto the source image pixels along the X axis (fast scan direction). Mapping of the source onto the target comprises two steps. First the coverage of source space pixels by the target space pixels must be determined. For this step, the problem may be redefined as follows: we will say that the source pixel belongs to the footprint of a target pixel if and only if its midpoint (or centre) falls within that target pixel. Mathematically, the problem can be reduced to finding a solution to the inequality:

$$t_k \cdot \frac{S}{T} \le s_j + \frac{1}{2} < t_{k+1} \cdot \frac{S}{T},$$

where k is the index of the target pixel and j is the index of the source pixel; t and s are the distances from the origin to the left boundary of each pixel. S and T are the dimensions of the Source and Target images respectively. The inequality is expressed in source space and the size of the source pixel is 1.

To find out which target a given source belongs to, we need to find the smallest such k for any given j, that the left inequality is satisfied.

$$j \ge \frac{S}{T} \cdot k - \frac{1}{2}$$

$$k \le \left(j + \frac{1}{2}\right) \cdot \frac{T}{S}$$

$$k = \left\lfloor \frac{2jT + T}{2S} \right\rfloor$$

Knowledge of j and k allows us to adjust the read and write addresses of the source and target pixels respectively.

The second problem we need to solve is to determine the distance between the centre of the given source pixel and the centre of the target pixel. This information is required for determining the contribution of a given jth source pixel to a corresponding target cluster (using the digital filter, which is described in the following). All the source pixels within the footprint of a target pixel form a single target cluster. However, the correspondence between any source and target pixel is determined by whether the source pixel belongs to the footprint of the filter, rather than the footprint of the target pixel.

At this stage it is important to appreciate the way the digital filter operates. The filter function is evaluated at a number of points sometimes referred to as filter taps (often for a silicon implementation). The number of filter points gives the filter footprint (number of source pixels falling under the filter function footprint), which is scale factor dependent.

Figure 4:
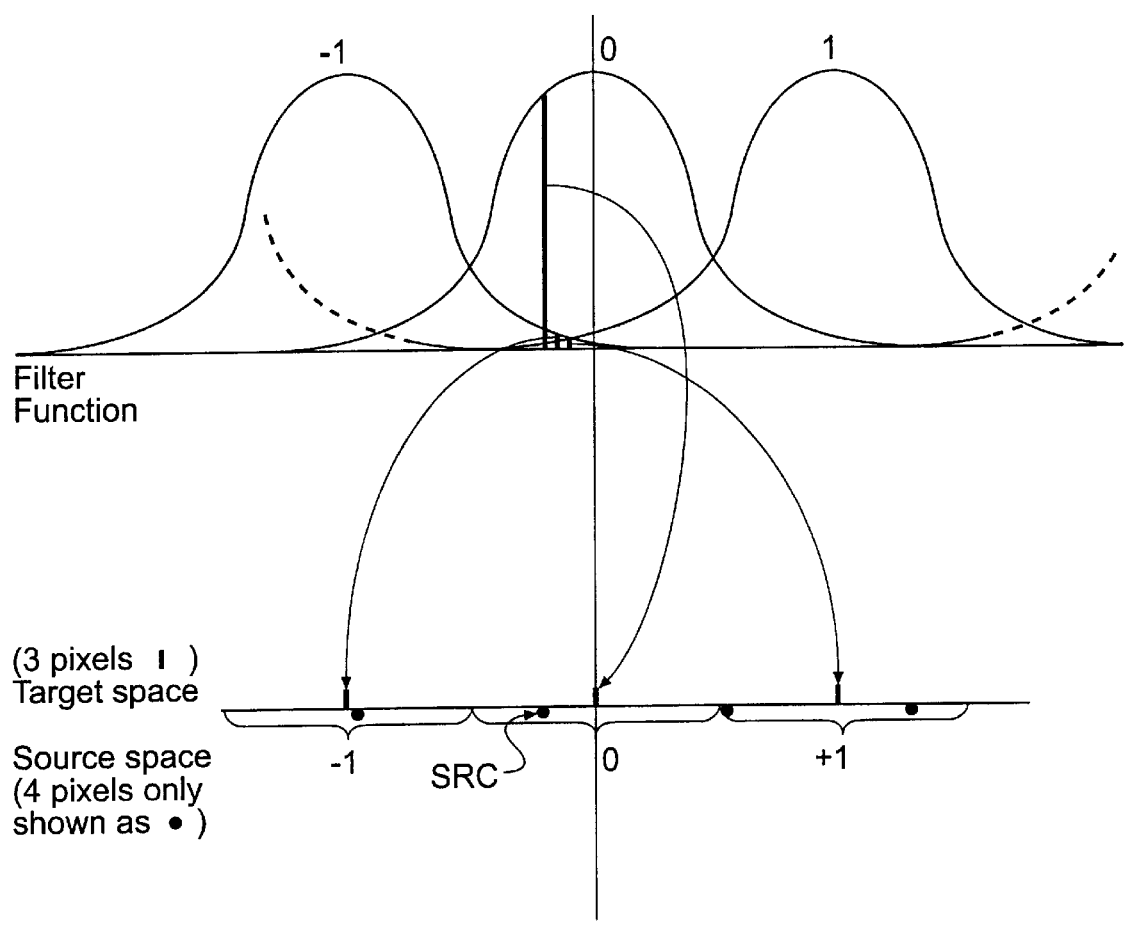
FIG. 4 is a diagram showing the filter function in relation to source and target space for downscaling.

FIG. 4 illustrates the principle described above with a filter spanned in target space having a varying footprint of three or four (either three or four source pixels fall under the filter function curve for each target pixel because of the particular scaling ratio). The diagram shows three filter function curves, one for each of three target pixels. Once the source pixel labelled SRC has been mapped into target space, its horizontal position along the various filter function curves under which it falls determines its contributions to the target pixels shown. Clearly, its greatest contribution is to the target pixel whose footprint it falls within, but it also makes contributions, determined by the relevant filter function value, to the target pixels to either side of it, since the filter functions overlap and it is within the kernel supports (shown as the areas under the filter function curves) of the functions to either side. The vertical bars representing the contribution of the source pixel are shown horizontally spaced for clarity but are co-incident in practice.

Thus, any jth source pixel contributes to all the target pixels into the filter supports of which it falls. This number of contributions (the filter width) is a software (programmable) variable. Filter width is independent of the scaling factor, whereas the footprint number is not. This explains why the number of source pixels contributing to a target pixel (given by the filter footprint number) usually differs from the number of contributions each source pixel makes (the filter width).

To continue with X preparation, we need to find how each source pixel contributes to the target pixels.

We start from determining the distance $D_0$ for a jk pair determined by the equation:

$$D_0 = k + \frac{1}{2} - \left(j + \frac{1}{2}\right) \cdot \frac{T}{S},$$

The distance is expressed in target space. We can observe that with the target cluster size of 1 (target space), the (contributing) distance to the other target pixels that the jth source pixel contributes to, can be expressed as:

$$D_i = D_0 + i, \text{ where } i = -Fw_{1/2} \ldots Fw_{1/2},$$

Knowing each of the contributing distances for the source pixel, we can proceed to precompute the integral contributions in X. These remain constant throughout the processing since we load subsequent scanlines in Y, observing their correspondence in X. In other words, the jth source pixel along any line will always be processed a number of times corresponding to the filter width Fw, using the part of the filter function curve to which it has been allocated in each case. Each of its contributions is allocated to a different target pixel.

Once X preparation is complete, scanlines from the source are read into the PE array and scaling can begin, in the X or Y direction. In the example, scaling begins in the Y direction.

(d) Y scaling—downscaling

In the Y (slow) direction, neighbouring data is distributed across subsequent scanlines. For clarity, let us assume that we are using the a filter with a filer width of three, spanned in the target domain.

Any even or odd filter width can be used and, in practice, the width of five or seven may offer the best compromise between speed and the quality of output.

The main target in designing this part of the process (or algorithm) is to minimise the number of I/O operations. The number of source pixels $N_{tot}$ that contribute to a single target pixel is theoretically unlimited and determined by the scaling factor and the width of the filter.

$$N_{tot}(i) = \sum_{n=i-Fw_{1/2}}^{i+Fw_{1/2}} (\lceil (n+1) \cdot R \rceil - \lceil n \cdot R \rceil)$$

where:

$$R = S/T \geq 1$$

The reverse scale R represents the size of the target pixel in source space pixel units; S and T are the dimensions of the source and target images, respectively.

However, the number of the target pixels that any given source pixel contributes to is constant and equal to the filter width. Thus at any time after the source data is read, we are able to generate all the source pixel contributions to all the target pixels. The number of contributions is given by $2Fw_{1/2}+1$ for an odd filter width. In order to do this, we need to establish the distance $D_n$ of the centre (mid-point) of the currently read source pixel to the center of all target pixels contributed to, in a similar manner to the X direction.

$$D_n = \left| \frac{1}{2} - \frac{i}{R} + n - \frac{1}{2R} \right|$$

where:
$n = -FW_{1/2} \ldots 0 \ldots Fw_{1/2}$ represents the index of the target pixel in the filter support in target space and i is the index of the source pixel. This and the following equations apply for the convention in which a mid-point criterion is used.

For the purpose of generating the contributions, an array of addressable memory cells in the form of a data queue of 1D interconnected memory cells is used. The spatial location of the cells within the memory is unimportant and different memory locations for the data queue may be used at different stages in the process. Each cell is connected to its neighbours for data transfer. The data queue functions as an accumulator in the Y direction and also shifts values from one cell to the next. After initialisation, in which the cells are set to zero, values are loaded sequentially into the queue. Each value starts in a cell at one "end" of the queue and is shifted up the queue as other values are loaded. The values are eventually shifted out of the queue (in general using a queuing or first-in first-out principle). One-data queue is defined per PE in this case. The queue has the same number of cells as the filter width in both the first and alternative pixel-PE mappings.

In downscaling, after each source pixel is read, each of its contributions is accumulated onto a corresponding cell of the data queue. The accumulated contributions in each cell are shifted to the next cell when the cluster boundary is crossed and the top cell's accumulate contributions are complete.

Once all the contributions have been accumulated in the top cell, the completed target pixel (for which all contributing source pixels have been read) must be stored in memory.

Figure 5:
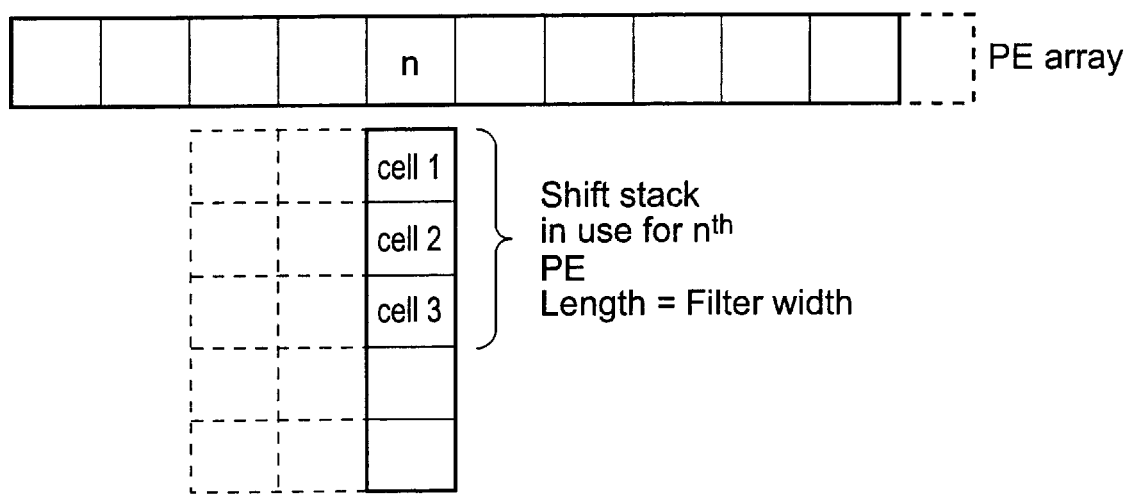
FIG. 5 is a diagram showing the PE array and the memory cell array attached to one PE.

FIG. 5 shows the PE array and the 3-cell data queue of the first PE. In essence, the data queue functions as follows in downscaling in the Y direction. The three contributions of each source pixel are calculated from the filter function and added one into each cell. They are summed with any contributions which may already be present from previous source pixel. The position of the source pixel with respect to target space is needed for calculation of the filter function. When the next source pixel is processed, the position in target space is recalculated. When the target pixel boundary is crossed, the top cell contents form a complete intermediate pixel (or target pixel if the X scaling has already been carried out) and will be stored in memory. The number of contributions in a complete cell depends on the scaling factor and filter width.

When the top cell has written its contents to external memory, the contents of the other cells move up one position, the bottom cell initialises to zero and the next three source pixel contributions are added. This source pixel will be the first contributor to the accumulating values in the bottom cell. The accumulating values will be shifted two positions as the following source pixels are read and eventually shifted into external memory.

To enable us to compute the contributing distances and determine when the target pixel boundary has been crossed, there is provided a memory cell, or "distance accumulator". The distance accumulator stores the distance from the cluster boundary of the first target pixel to the current source pixel, expressed in the target coordinate system (i.e. a distance of "1" is 1 target cell). At each subsequent source pixel read operation, the distance accumulator is incremented by the size of the source pixel in the target space (which is simply T/S).

When the value of the distance accumulator exceeds one, a write-shift sequence of the memory cell array is initiated and the distance accumulator is reset in preparation for the next cycle by decrementing it by one.

When a narrow image is split into vertical blocks (second partitioning example mentioned above and shown in FIG. 12), the initial value in the distance accumulator corresponding to the position of the first source pixel in the cluster may differ for each sub-image.

The target pixel boundary crossing condition can also be computed using integer arithmetic and thus avoiding the rounding errors associated with the fractional size of the source pixel expressed in the target space.

(e) X scaling—downscaling

In the fast scan direction using the first mapping (one PE per source pixel), there is no need for accumulation of data from more than one line: all the contributing pixels are available at the same time. The difficulty lies in the fact that the pixel values are distributed along the length of the PE array. Hence there is a need for spatial accumulation. The source pixels are read into the PE from external or internal memory and may be either pre-scaled (in the other direction) or loaded directly from the source image. Where pre-scaled, at least some of the intermediate pixels may be left in the PEs from the previous scaling step.

The X preparation has already determined which of the source pixels contribute to which target pixels, and computed the contributing distances. We must now communicate the source contributions to the correct accumulating PEs. The source pixels (PEs) have been grouped into target pixel clusters. One of the PEs in each target cluster is designated as the accumulating PE. It is this PE which is responsible for selective storage of the contributions flowing from other PEs and for writing the data, when all the required contributions have arrived.

Figure 6:
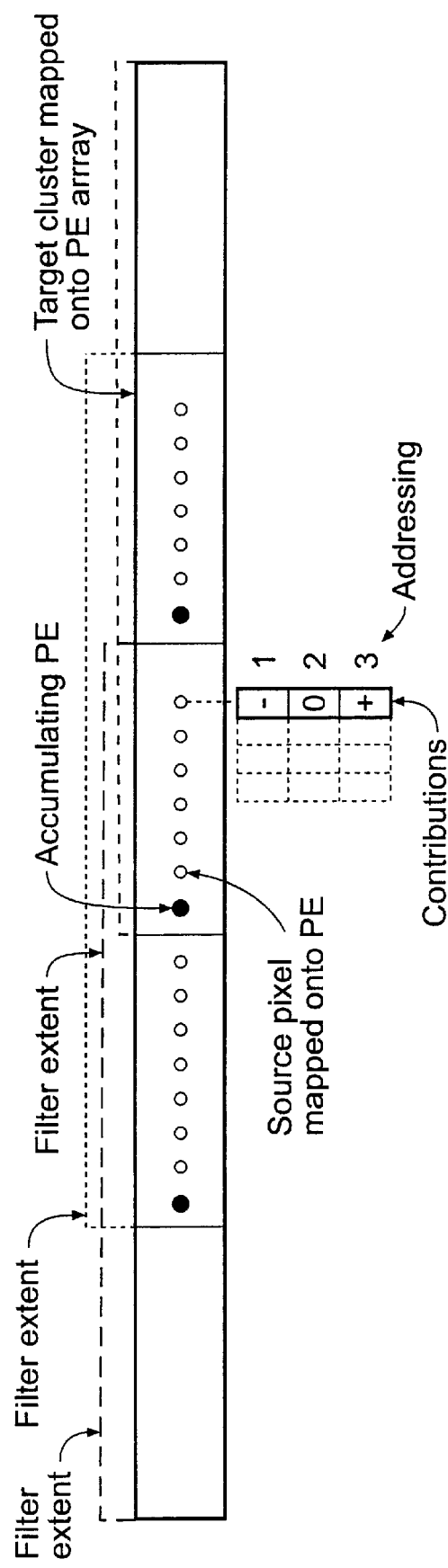
FIG. 6 is a diagram showing data swazzle for downscaling.

FIG. 6 shows a sample clusterisation of a set of source pixels. It should be noted that the clusterisation method, in which the source pixells membership of a target cluster is determined by the location of its centre within that target cluster, allows the number of source pixels in subsequent clusters to vary. This is a natural consequence, unless scaling is performed on a sub-pixel level in the source domain. FIG. 6 indicates the extent of three of the partially overlapping filter functions for the source pixels.

The contributions of each source pixel are computed generally as described above for the Y direction. Three filter function values are calculated, for a filter width of three shown in the diagram, and stored in three cells of an array of memory cells for each PE. In FIG. 6, the contribution destined for the leftmost accumulating PE of the three PEs to which the source pixel contributes is designated "+"; the central contribution is designated "0" and the right-hand contribution is designated "−". Once each PE has computed these contributions for its target clusters (there are $2Fw_{1/2}+1$ of these, according to the convention we have adopted), the contributions must be accumulated to give target pixel values.

To minimise the amount of data traffic required to communicate the contributions to the accumulating PE of each target cluster, an accumulation method across the PE array is used, which may be referred to as a (decremental depth) swazzle. Swazzle refers to movement of data along the PE array. In this case, the movement is generally uni-directional (to the left in the diagram).

In the example shown, the contributions from each source pixel are stored (temporarily) in the three memory cells and then each contribution is in turn shifted along the PE array to reach its accumulating PE (each contribution is destined for a different accumulating PE: one per target). The parallel processing means that all the first contributions ("−") from the entire line of PEs are shifted until they reach their accumulating PE. The method uses indexing to indicate when each contribution has reached its accumulating PE and it is "consumed" by that PE, travelling no further. The swazzle cycle ends when all the first contributions have been consumed and the next swazzle cycle (for the second contributions, indexed "0") can then begin.

Before the swazzle can begin, we must establish the minimum number of swazzle steps required to move a packet of data across the full width of a single target cluster (σ);

$$\sigma = \lceil R \rceil$$

The difference in size between target clusters is never greater then one. The accumulating PEs that belong to the smaller clusters will be disabled for the extra swazzle step required to transport the data to the accumulating PES of the larger clusters. Because of our choice of location of the accumulating PE within the target cluster (the first or the last PE in the cluster), the swazzle operation is uni-directional. Each swazzle cycle transports the contents of one memory cell array cell of each PE (that is, one contribution) to its appropriate accumulating PE.

Figure 7:
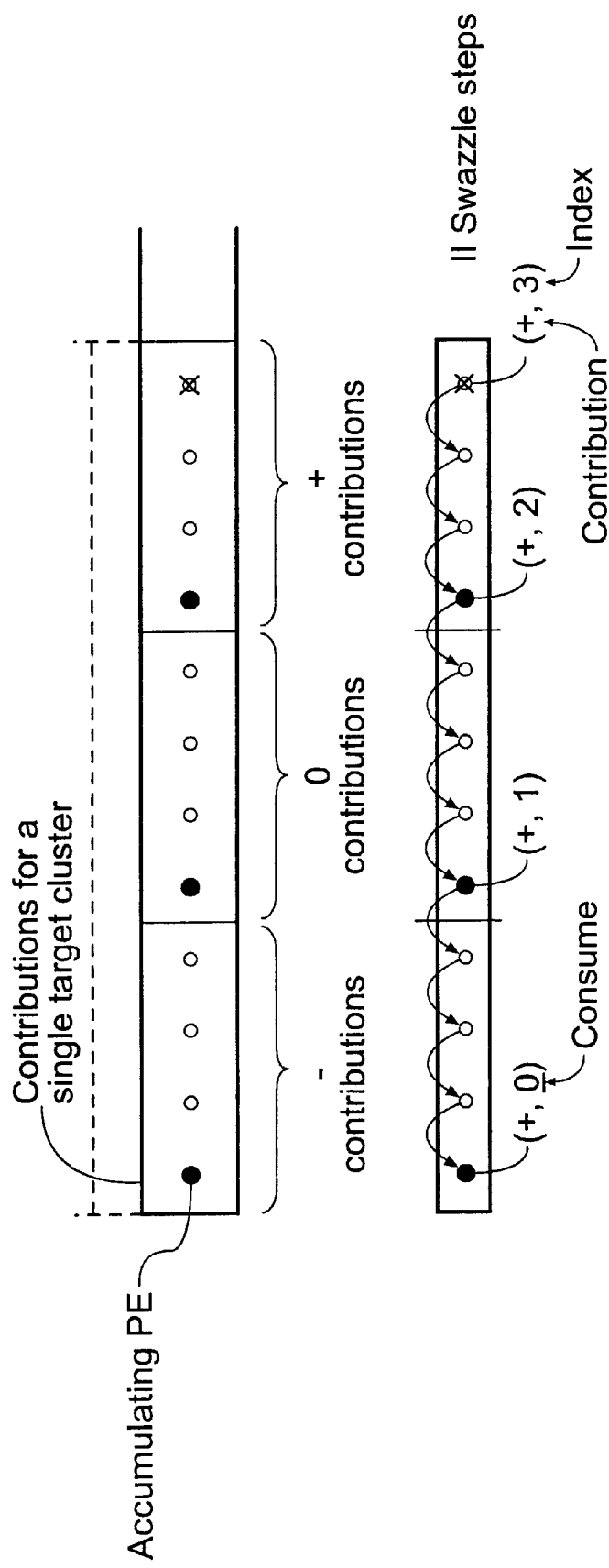
FIG. 7 is a sketch explaining movement of a single contribution in a single swazzle cycle.

FIG. 7 shows the contributions for one accumulating PE only, to aid understanding of the data movement. Source pixels in three clusters contribute to this accumulating PE. Those in the right-hand cluster are all "+" contributions and must travel across two cluster boundaries to reach the accumulating PE. The central cluster contributions are "0" contributions and the left contributions (within the same cluster as the accumulating PE) are "−" contributions. All the contributions in one group travel in parallel.

The total number of swazzle cycles required to assemble all the target pixels is equal to the filter support size in the target domain (in this case, three). Each swazzle cycle, however, does not require an equal number of steps. As we see in FIG. 6, for example the top or first cell value("−") shown for the pixel corresponding to the last PE in the target cluster will travel six steps across the PE array to its accumulating PE. The second contribution ("0") of the PE will travel a maximum of this distance plus one cluster, and the third contribution ("+") a maximum of this distance plus two clusters. Thus, subsequent contributions that each PE needs to propagate will travel as far as their ordinal number in the stack.

If we choose our accumulating PE to be the leftmost in the cluster, and consider the furthest PE (taking the worst case; all the contributions travel in parallel), the longest distance that the contribution must travel is $(2Fw_{1/2}+1)\sigma$, and the shortest is σ (one cluster length). This gives a total of $(2Fw_{1/2}+1)*(2Fw_{1/2}+1)\sigma$ swazzle cycles for the worst case. All the contributions in one swazzle cycle travel the same distance, but are not accumulated until they reach the appropriate accumulator PE. For, example, the first contribution from the accumulating pixel itself does not have to travel for its accumulation, but does so due to the parallel processing principle.

In order to guarantee that each contribution arrives at the correct target in the parallel processing system, each contribution is assigned an addressing number, according to its position in the memory cell array (see FIG. 6). A packet consisting of the contribution and its index number or address is assembled, loaded into each PE and swazzled across the PE array. FIG. 7 shows the movement of the furthest ("+") contribution. Each time a packet arrives at the accumulating PE, its address is decremented and the PE then checks the address. If the address is greater than zero (or less than zero: this will happen, for example, to the first contribution ("−") of the accumulating PE), then the contribution travels on to the next PE across the cluster boundary until all the index numbers have been decremented to 0. When the index reaches 0, the accumulating PE can add the contribution to its target pixel accumulator.

Once the accumulating PE has received all the contributions its value can be written and the next line of source (or intermediate) pixels processed.

The alternative mapping still requires a data swazzle, since source pixels do not just contribute to one, but several target pixels. In the preferred alternative mapping, one PE is provided per target pixel. The furthest any contribution needs to travel is across the entire filter width. Thus the number of steps in a single swazzle cycle is constant. Clearly, the number of swazzle cycles increases with the depth of the memory cell array.

Upscaling

Upscaling is performed in a similar fashion to downscaling, using the memory cell array and PE array. Since the reading and initial image partitioning steps (a) and (b) are directly comparable, they are not discussed further.

(c) X preparation—upscaling

For upscaling this step maps the target pixels onto the PE array and defines the correspondence between the source pixels and target pixels.

As for downscaling, we need to establish a framework for determining which source pixels contribute to which target ones. Consider bringing the source and target images into the common frame of reference of the source image and interpreting the pixels as regions rather than points. The FIR filter support is defined with respect to the source frame.

The structure of FIG. 3 applies analogously to upscaling, with reversed terminology. Thus, the source image (3×3 pixels) is to be expanded into the target image (24×24 pixels). One PE is provided per target pixel.

Preparation involves mapping the PEs of the SIMD array onto the target image pixels along the X axis (fast scan direction). The mathematical derivation of this and the source-target correspondence is analogous to the downscaling mapping, with source clusters replacing target clusters.

Figure 8:
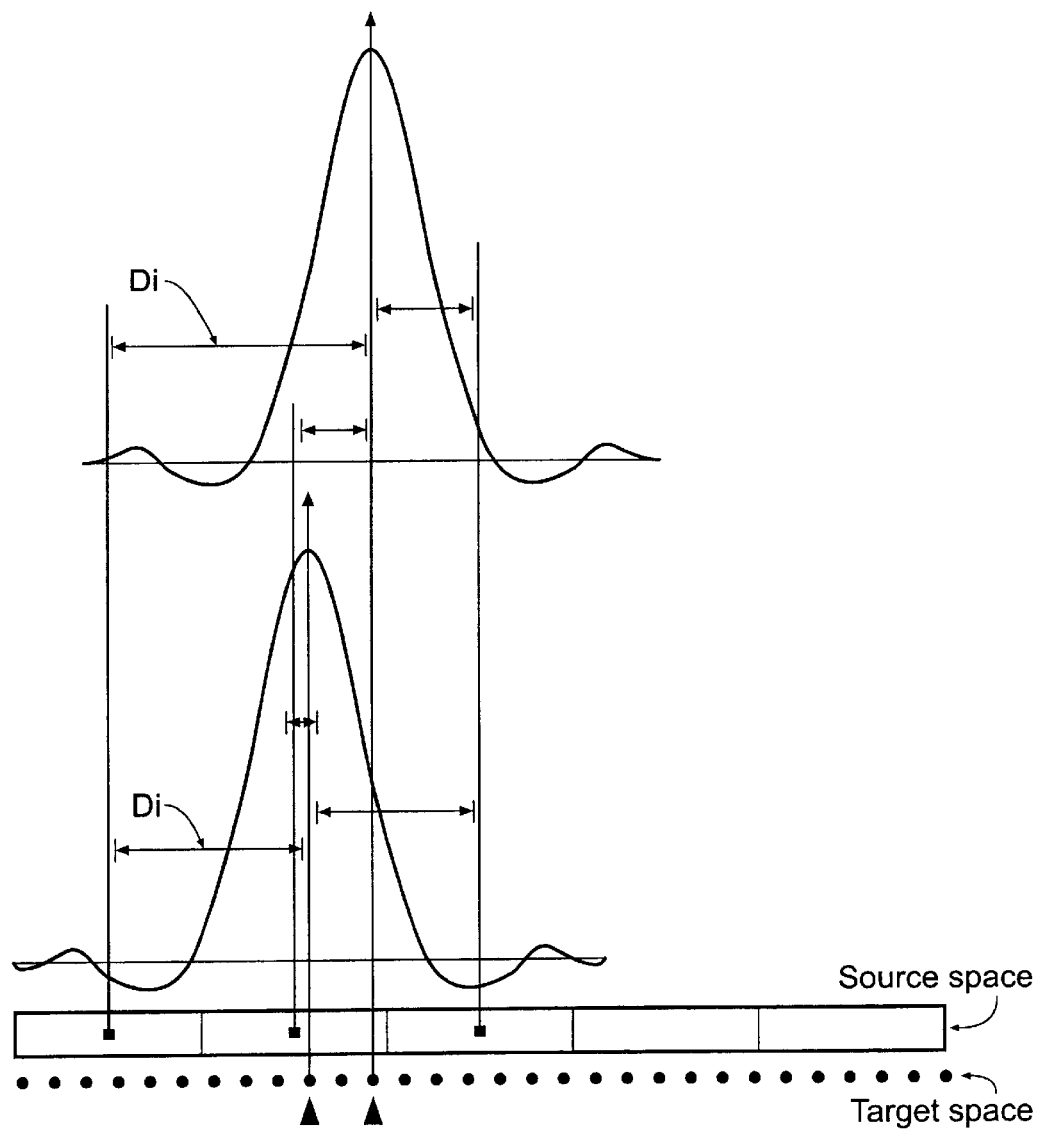
FIG. 8 is a diagram showing the filter function with respect to source and target space for upscaling.

FIG. 8 shows the filter functions mapped against target and source space. Here only two filter kernels (or function curves) are shown. They are spanned in source space. Each source pixel, shown as a rectangular region, gives rise to a plurality of target pixels, represented by dots The intensity of each target pixel is the sum of the contributions from the source pixels. The target pixels falling within a given source pixel share the same filter support. That is, they each have contributions from the same (in this case three) source pixels. However, their contribution distances Di to the centres of the source pixels differ. FIG. 8 shows the contribution distances for two highlighted target pixels. The PEs responsible for computing the convolution kernel are the PEs for the leftmost pixels within the kernel function.

Figure 9:
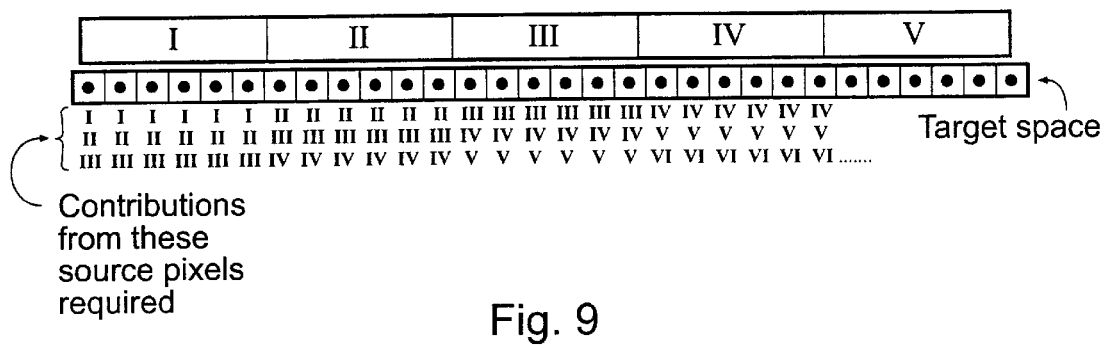
FIG. 9 is a diagram showing the contributions to each target pixels in upscaling.

FIG. 9 shows the correspondence between source and target pixels. Each target pixel requires three contributions, but each source pixel may contribute a different number of times. In fact, in upscaling, the situation is the reverse of downscaling: in upscaling the number of source pixels contributing to a target pixel is determined by the filter width and the number of target pixels that a source pixel contributes to is the filter footprint number (a function of the scaling ratio).

(d) Y scaling—upscaling

Y scaling is treated first for consistency, although it will generally take place on the intermediate pixels produced by X scaling.

In Y scaling, the memory cell array is loaded with a sequence of the source pixels (without pre-processing). The length of the sequence is equal to the filter width. For example, a sequence of three vertically spaced pixels is used for a filter with a width of three. In contrast to the downscaling method, there is no accumulation within the memory cell array. The three source pixels contribute to each of the target pixels within a source cluster, with contributions based on the distance to the centre of the target pixel calculated using the filter function. In this way, despite sharing the same source pixels, the three values of the convolution will be unique for each target pixel.

The process moves across source space, calculating the three contributions for each target pixel using the original values in the memory cell array, adding the three contributions to make up a single target (or intermediate) pixel and possibly writing to external memory. Once the source cluster boundary is reached, the sequence is shifted by one cell in the memory cell array, to discard one source value at the top, read in a new source value at the bottom and move the other two up one position. The distance and contribution calculations are analogous to those for downscaling.

(e) X scaling—upscaling

In X scaling, the source pixels needed for contributions to each target pixel move between neighbouring PEs using a swazzle technique. This technique allows each target pixel to accumulate the three source pixels it requires to compute the necessary contributions. The value of the filter function for each source has been pre-calculated by the X preparation and the main task is to assemble the three sources for each target pixel.

The data is loaded in such a way as to facilitate the assembly of relevant source pixel values for the target pixels. The following describes the method used in one embodiment, but other, equivalent methods may also be appropriate.

Initially, the PE array is loaded with a repeating sequence of the source pixels used in that source cluster. The first value in the sequence is the leftmost filter support source pixel as before. Each PE loads once per scan line to minimise the number of loads from external memory (channel read). The sequence again has a length equal to the filter width (3 in the following).

Figure 10:
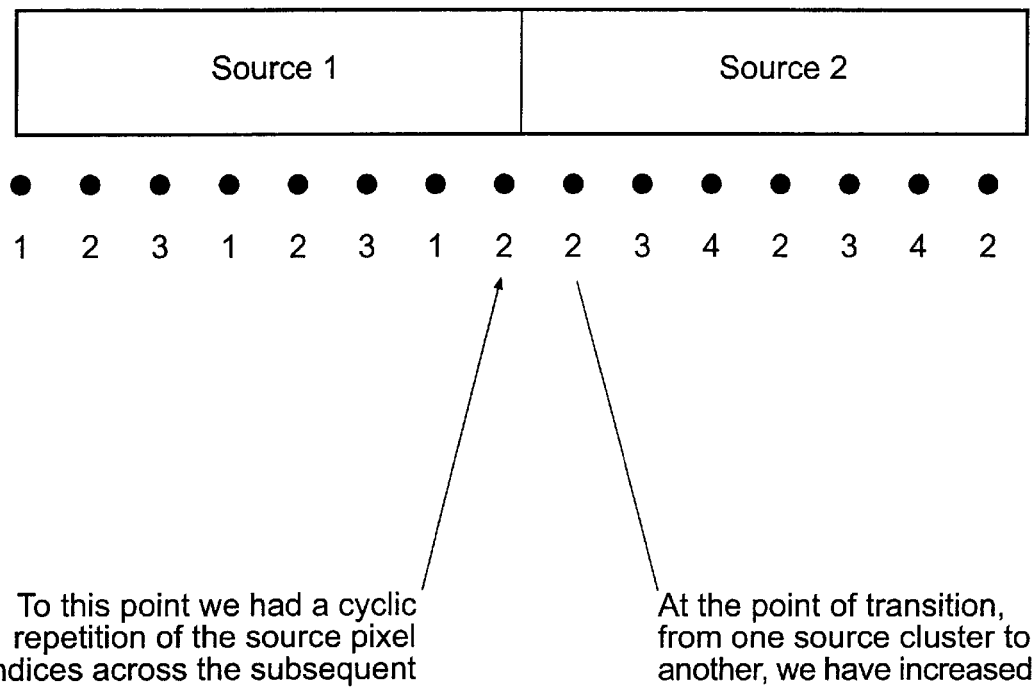
FIG. 10 is a diagram illustrating the loading sequence for data swazzle in upscaling.

FIG. 10 is a representation of the PE array once it has been loaded, with the source pixel values given as "1" (for the first value loaded, corresponding to the first source pixel) to "3". The sequence of source pixels is interrupted by the transition across the source cluster boundary, is shifted by one value (that is, moves the selection of source pixels one position to the right) and restarts, to give the values shown. Up to the transition point there is a cyclic repetition of the source pixel indices across the subsequent PEs representing target pixels. The current cycle shown in FIG. 10 started with the index "1", this being the left-most source pixel required by the group of destination pixels sharing the current support. At the point of transition, from one source cluster to another, the leading index increases by one, compared to the previous cluster. The index of the last target pixel in the previous cluster is not significant.

Figure 11:
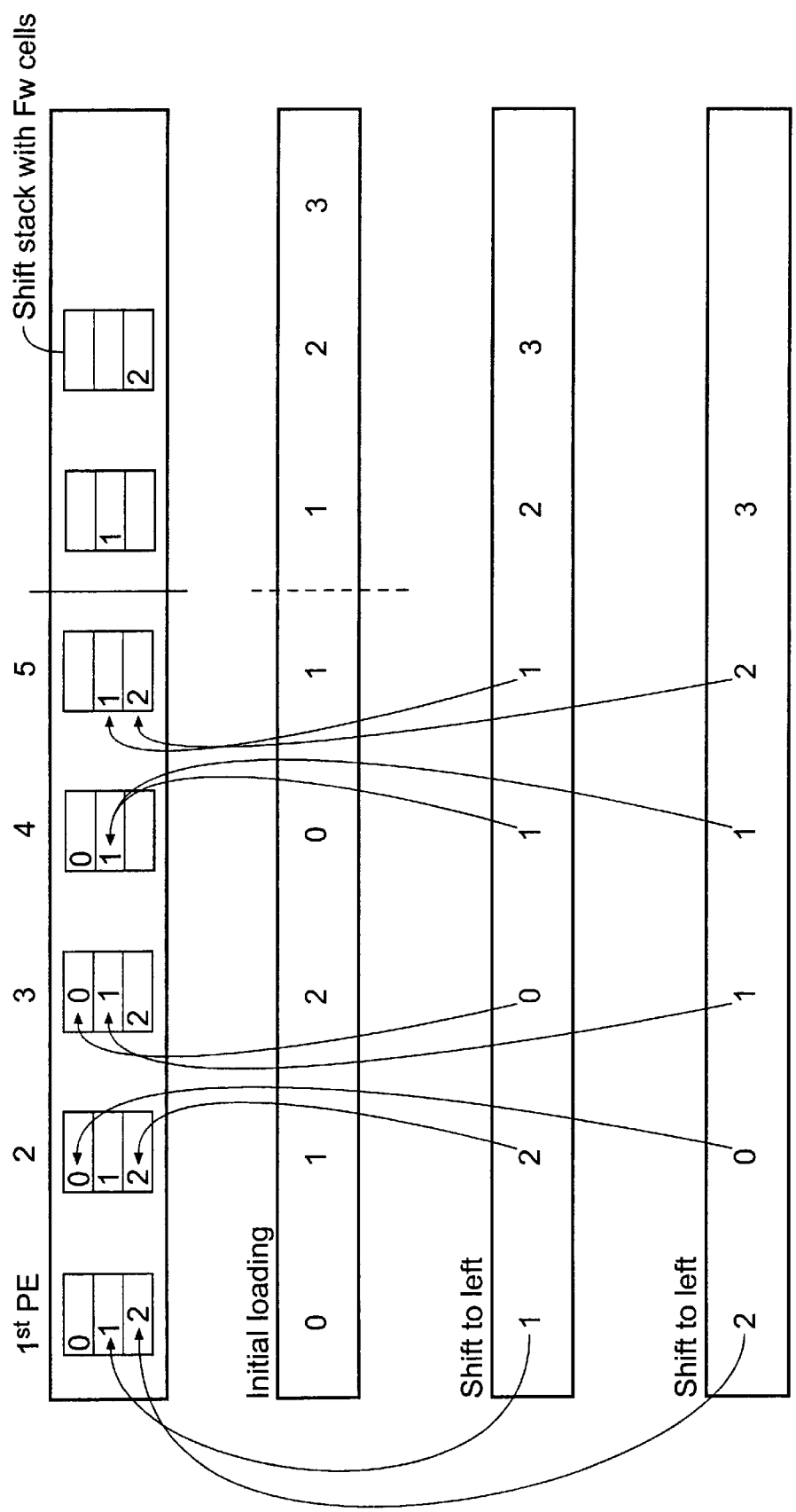
FIG. 11 is a diagram illustrating the movement of contributions during upscaling data swazzle.

The next step is to assemble the three source pixel values for each target pixel and this is achieved by swazzling as shown in FIG. 11. Each source pixel value is allocated to one of the array of cells in the PE memory. Once all the cells are filled with the value, the convolution can be computed using the results of the X preparation, the resultant contributions added together and the target pixel written to external memory.

FIG. 11 is a diagrammatic representation of the preferred swazzle process, concentrating on a single cluster. The uppermost block in the diagram shows the memory cell array associated with each PE. The second block shows the initial loaded sequence. The sequence consists of the source pixel values but is shown as indices of the three source pixels (given as 0, 1, 2 for clarity). Each value is positioned in the memory cell array according to its index. Thus the '0' value is loaded in the uppermost cell and so on.

In the third block down, the values have been shifted (swazzled) one position to the left. Note that the shifted value of the last PE to the right in the first cluster is a '1'. The value is therefore allocated to the second cell and overwrites the initial value '1' which was already present. This redundancy in data means that the PE will need an extra swazzle step to assemble all the values it needs.

The fourth block shows the second swazzle step. This swazzle step fills the remaining cells in the first three PEs. In contrast, the fourth PE receives a '1' which is overwritten. The last PE receives a '2'. At this stage a further shift to the left (not shown) will be sufficient to fill the fourth PE, but will shift an unwanted '3' (which is thus ignored) into the last PE. This '3' is shown in the fourth block as the first value in the second cluster.

There are no '0's available to the right of the last PE. The final step is therefore a single shift to the right (not shown). This will always be the case, to read the value for the lowest index into the last PE, unless the sequence fortuitously ended on the lowest index, because (by definition) the lowest index is not present in the next block. In some cases, (for example if the transition is '0 1 2/1 2 3'), two or more reverse swazzle steps will be required or the shift will be across the entire cluster to avoid calculation of how many reverse swazzle steps are required.

The cluster size is scale factor dependent and thus known. We can compute the maximum number of steps to the right (reverse swazzle) and to the left required.

Generalisation of the algorithm—up-scaling

From the above it can be seen that, while the underlying principle for both of the scan directions remains the same as for downscaling, there are two main differences.

The first is that we change the standard pixel to PE mapping from 'one source pixel per PE' to 'one target pixel per PE'. A suitable alternative PE mapping is one target pixel per PE for both upscaling and downscaling.

The second difference is that the filter support size is constant and expressed in the source space. All the target pixels that are the members of the same source cluster, share the filter support source pixels. What is different for each of the target pixels is the position of the centre of the filtering function with respect to the centre of the filter support pixels.

Other Factors

Edge Pixels

The edge pixels pose a problem in that only part of the filter support required for generation of the target pixel is available. The missing outer pixels must be artificially generated either by mirroring or replication.

Image replication in the slow direction may be achieved by freezing the read address for the first $Fw_{1/2}$ accumulate-shift cycles.

Mirroring in Y does not require introducing 'virtual pixels'. In a simplified interpretation, as long as 'virtual pixel' values are required (until such time as $2*Fw_{1/2}$ target clusters have been processed) the contributions from each of the source pixels will be added to two cells of the memory cell array instead of one.

Implementation—integer-only arithmetic

In the slow scan direction, the process algorithm relies on the cluster (source or target) boundary-crossing condition for triggering a write-shift or shift-read event. So far, this has been described by expressing the size of the source pixel in the frame of reference of the target pixel or vice versa. This implies that one of the values will be fractional, which with a finite precision computing device may lead to errors, once the number of samples is sufficiently large. There is therefore an advantage to move to integer arithmetic. The crossing condition can be presented by the following set of equations:

$$\Delta \leftarrow \delta_0$$

$$\Delta \leftarrow \Delta + \frac{1}{r_s}$$

$$\Delta \geq 1 \rightarrow \Delta \leftarrow \Delta - 1$$

$$\Delta' \leftarrow \delta_0 \cdot S$$

$$\Delta' \leftarrow \Delta' + T$$

$$\Delta' \geq S \rightarrow \Delta' \leftarrow \Delta' - S$$

Thus, if all the sides of the above equations are multiplied by the common factor of S (source image size), we create integer-only conditions.

Implementation—greedy image partitioning

Figure 2:
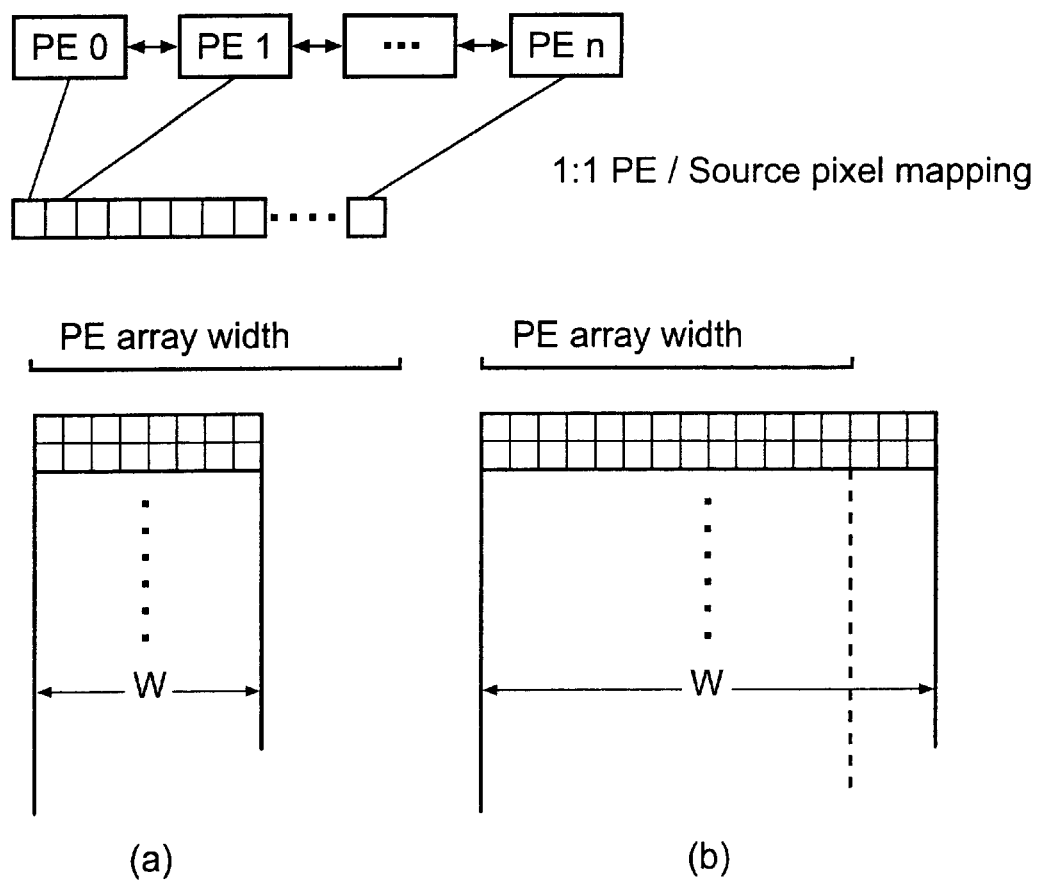
FIG. 2 is a diagram showing a mapping of source pixels onto a PE array.

So far, we have only considered processing as presented in FIG. 2—some of the PEs belonging to the SIMD array were not utilised. This is particularly harmful for very long and narrow images.

As described in the previous paragraphs, in order for the scaling in the slow scan direction to work, the horizontal alignment of subsequently read lines of pixels must correspond to that of the lines read so far. The accumulation process assumes that the next pixel read is the one directly below the one the processing of which has just finished.

Figure 12:
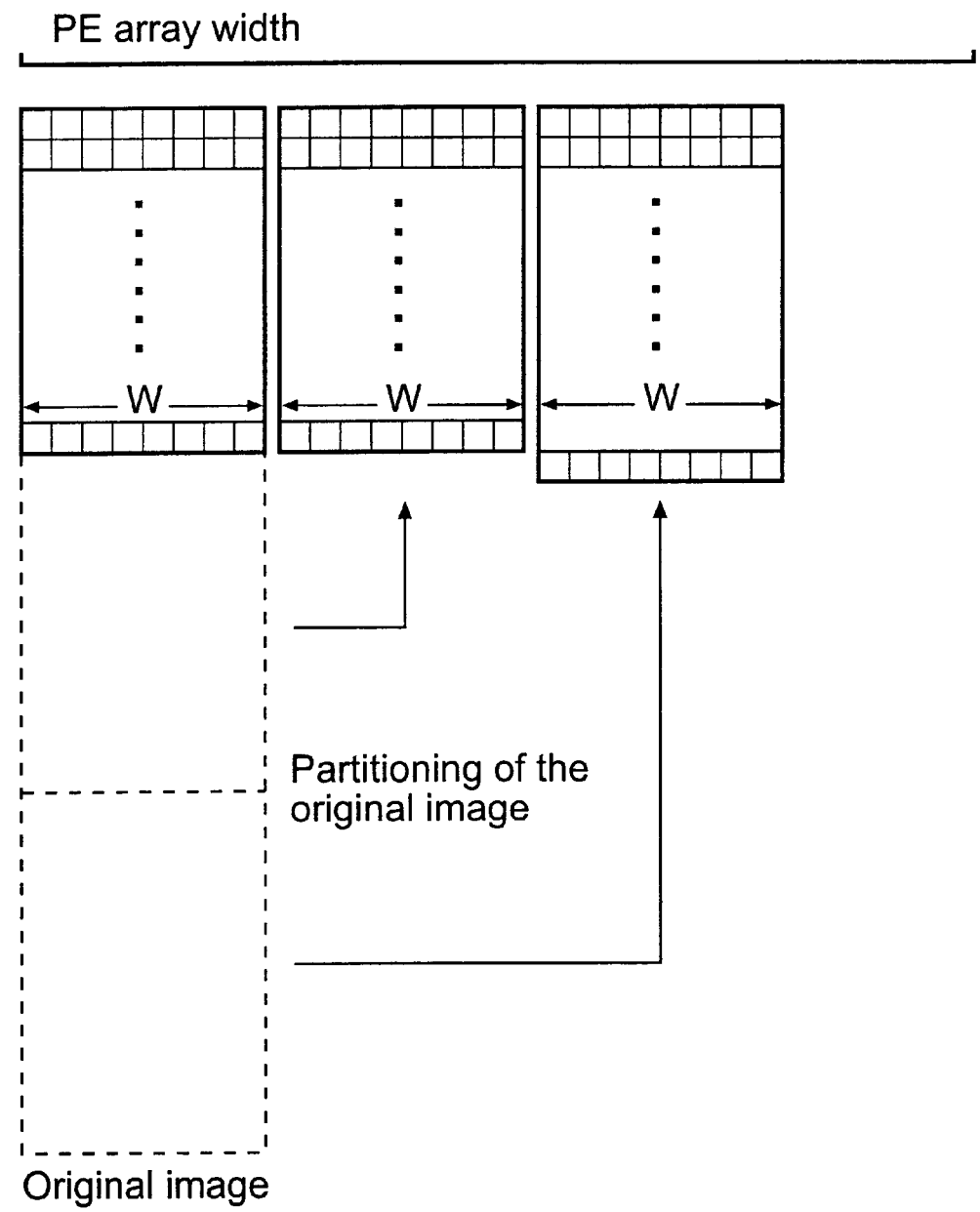
FIG. 12 is a diagram showing partitioning to increase PE utilisation.

This has the result that the preferred way of utilising the unused PEs is to partition the image along the slow scan axis as illustrated in FIG. 12.

Implementation—monochrome values and alternative pixel-PE mappings

So far, in our generic description of the algorithm for scaling of the digital images on the SIMD processing array, we treated the input pixels as a stream of (for example) monochrome one-byte values. Also, in order to make the description of the algorithm more transparent, we have generally assumed 'one source pixel per PE' mapping for downscaling and 'one target pixel per PE' mapping for upscaling.

None of the above assumptions is to be treated as binding, for other practical applications. The way the pixels and PEs may be mapped depends not only on the input format (8 bpp, 15 bpp, 16 bpp, 24 bpp, RGBA, YUV) but also on the I/O restrictions imposed by the SIMD architecture, such as: the read/write packet size, I/O latencies (it may or may not be more efficient to issue fine granularity I/O requests), inter-PE communication restrictions etc.

Indeed, as one example, for some applications it may be better to abstract from pixel level and treat the input as a set of separate colour channel values (YUV), which together make up the pixels.

Implementation—alternative PE inter-connection networks

The description assumes that the PEs are connected in a linear array with nearest-neighbour bi-directional communication capacity.

The other common configuration is as a 2D array with a two dimensional bi-directional (up, down, left, right) nearest-neighbour configuration, often known as a mesh.

One of the ways in which our process algorithm can be moved to such an architecture is to treat the mesh as a set of linearised and independent arrays, ignoring the Y connection, and to partition the image recursively among the many independent 1D sub-arrays.

In some cases it could be preferable to exploit the 2D connectivity and use the X methodology substantially as described herein for both the X and Y directions.

EXAMPLE

As an example let us consider downscaling a 32-bit RGBA image using an SIMD device consisting of 1536 processing elements (PEs) each with 2 k of local DRAM memory, arranged in six blocks with a linear intercommunication network connecting the nearest neighbouring PEs and incorporating an Embedded Processing Unit (Epu) acting as a controller for the entire chip as well as a separate channel controller unit enabling one to overlap I/O and computation at the array level.

The choice of the input format for this example was dictated by the ease of the address computation and extraction of pixel data from the packets being transferred.

Let us assume that the source image is located in an external (not on-chip) memory and is directly accessible by our SIMD device. The act of reading or writing data from/to external memory to the on-chip memory will be referred to as a 'channel operation'.

One of the main design goals of the algorithm was to minimize the number of channel operations required by the algorithm. A single processing cycle can contain only one read-channel operation and one write-channel operation. Since, by the very nature of FIR filtering, each resulting pixel value is assembled from a potentially large number of potentially spatially distant source pixels, this implies dependency on the inter-PE data exchange for an efficient process. Also, having a one-dimensional connectivity network, and limited PE memory, shaped the algorithm to be data-accumulative in the Y direction.

Once the read and write addresses are adjusted for each PE, we can enter our main processing loop. Scanlines are loaded through the channel operation, and each PE performs the Y-scaling. The contributing distance in Y is updated after each scanline has been read. Once the target cluster in Y boundary is crossed, the X scaling step is triggered. It involves retrieving the topmost values from the accumulator, computing partial contributions at each PE, and transporting the values thus obtained to the PEs designated as writing the target pixel values. This is achieved via the decrement depth swazzle. After all the partial contributions have arrived at the writing PEs, the write channel operation is initiated and the processing loop can continue on to next target pixel in Y.

After all the target pixels in Y have been processed, and so all the source pixels have been consumed, the processing stops.

Each of the target pixel values was computed analytically in X and Y as a convolution of the filter function and the image intensity step function taken over the filter support range. Interpolation of the image intensity function produces some visual improvements, but for the majority of real-time applications the extra timing penalty outweighs the visual benefits. Of much greater importance for the output quality is performing analytical rather then approximate convolution. For simplicity of description, the issues of border pixels and handling of extensions in X and Y directions have not been treated.

In the implementation a number of filtering functions were used, with widths ranging from 1 (sample point) to 7, from the simplest step or bell functions to Mitchell and Lanchos (sinc256). The convolution was performed analytically, which, as mentioned above, produced significant visual improvements over the interpolating implementation using the Romberg integration method. The main improvements manifested themselves in a reduced number of artifacts such as low frequency banding, which is particularly harmful on solid colour images.

In the example described using the SIMD approach, the non-decimating scaling method traditionally associated with non-real-time applications was successfully implemented with highly satisfying performance results. VGA <–>, RDTV scaling is achieved at 60 fps with width five filter (target space) or close to 100 fps for the width three filter.

What is claimed is:

1. A parallel processing method of scaling a digital source image consisting of a matrix of X by Y pixels into a target image, comprising the steps of:

mapping the source pixels onto the target pixels;

scaling the source image in the X or Y direction in parallel using a processing element (PE) array, each PE including a number of addressable memory cells for storing values corresponding to one or more pixels, to produce intermediate pixels that are scaled in one direction by determining contributions to each intermediate pixel using a digital filter and accumulating the contributions for each intermediate pixel, wherein each source pixel contributes to one or more intermediate pixels and each intermediate pixel receives contributions from one or more source pixels, and in which values are shifted in said memory cells during Y scaling such that they are shifted up the array one position when the process crosses a cluster boundary; and subsequently scaling the intermediate pixels in the other direction in parallel to produce target pixels by determining the contributions to each target pixel using the filter and accumulating the contributions for each target pixel;

wherein each intermediate pixel contributes to one or more target pixels and each target pixel receives contributions from one or more intermediate pixels.

2. A method according to claim 1, including the step of mapping a cluster of adjacent higher-resolution pixels onto each of the lower resolution pixels, in which a higher resolution pixel belongs to the cluster of a lower resolution pixel if its centre falls within that lower resolution pixel.

3. A method according to claim 2, including the step of calculating the distance from the cluster boundary as the source pixels are read in and defining process changes or increments to occur when the cluster border is crossed.

4. A method according to claim 1, including the step of calculating the distance between the centre of each higher resolution pixel and the centre of each lower resolution pixel to which it contributes or from which it receives contributions in the X and Y directions.

5. A method according to claim 1, in which integral filter function values for the filter function are determined for the X direction in an X preparation step.

6. A method according to claim 5, in which the X preparation step is performed prior to reading the pixel value data.

7. A method according to claim 1, in which the filter function for each lower resolution pixel is evaluated at any suitable number of points known as the filter footprint number, each point corresponding to a source pixel in downscaling or to a target pixel in upscaling; the filter footprint number being determined by the footprint of the filter function in source space or target space respectively.

8. A method according to claim 1, in which integration of the filter function is determined analytically, without approximation of the integration.

9. A method according to claim 1, in which in downscaling, (and in each direction) each source pixel contributes to a number of target pixels determined by the filter width and in upscaling (and in each direction) each target pixel receives contributions from a number of source pixels determined by the filter width.

10. A method according to claim 1 in which one PE is provided per pixel of the higher resolution image and the memory cell array is of the same length as the filter width.

11. A method according to claim 1 in which one PE is used per pixel of the lower resolution image and each PE processes two or more neighbouring higher resolution pixels which are read into the PE sequentially.

12. A method according to claim 1, in which a PE-pixel mapping is automatically selected according to process conditions.

13. A method according to claim 1, using SIMD processing on each line of source pixels.

14. A method according to claim 1, in which data is swazzled between PEs for X scaling; the data being swazzled a certain distance across a predetermined number of cluster boundaries until it reaches the correct PE for accumulation to make up target pixels.

15. A method according to claim 1, including the steps of reading the source image before scaling and analysing the source and target dimensions and writing the target pixels to external memory after scaling.

16. A computer program, algorithm or method of controlling a computer for use in SIMD processing to scale a digital source image consisting of a matrix of X by Y pixels into a target image using a method as defined in claim 1.

17. A computer program product comprising the program according to claim 16 loaded on a carrier, such as a CD or ROM memory or transported on a carrier wave.

18. A parallel processing method of scaling a digital source image consisting of a matrix of X by Y pixels into a target image, comprising the steps of:

mapping the source pixels onto the target pixels;

scaling the source image in the X or Y direction in parallel to produce intermediate pixels that are scaled in one direction by determining contributions to each intermediate pixel using a digital filter and accumulating the contributions for each intermediate pixel, wherein each source pixel contributes to one or more intermediate pixels and each intermediate pixel receives contributions from one or more source pixels; and subsequently scaling the intermediate pixels in the other direction in parallel to produce target pixels by determining the contributions to each target pixel using the filter and accumulating the contributions for each target pixel;

wherein each intermediate pixel contributes to one or more target pixels and each target pixel receives contributions from one or more intermediate pixels, and in which a processing element (PE) array is used, in which interconnections allow data to be moved (swazzled) along the PE array, each PE including a number of addressable memory cells, in which values corresponding to one or more pixels may be stored, and between which the values may be shifted, and in which the Y scaling step for downscaling includes the steps of multiplying the source pixel by the appropriate filter function values and reading the resultant contributions for each source pixel into the cells in the memory cell array, adding them to any contributions from one or more lines above the present scanline which are already in the cell; and incrementing to shift the feed into the array by one position and move the top cell value out when a cluster border is crossed.

19. A parallel Processing method of scaling a digital source image consisting of a matrix of X by Y pixels into a target image, comprising the steps of:

mapping the source pixels onto the target pixels;

scaling the source image in the X or Y direction in parallel to produce intermediate pixels that are scaled in one direction by determining contributions to each intermediate pixel using a digital filter and accumulating the contributions for each intermediate pixel, wherein each source pixel contributes to one or more intermediate pixels and each intermediate pixel receives contributions from one or more source pixels; and subsequently scaling the intermediate pixels in the other direction in parallel to produce target pixels by determining the contributions to each target pixel using the filter and accumulating the contributions for each target pixel;

wherein each intermediate pixel contributes to one or more target pixels and each target pixel receives contributions from one or more intermediate pixels, and in which a processing element (PE) array is used, in which interconnections allow data to be moved (swazzled) along the PE array, each PE including a number of addressable memory cells, in which values corresponding to one or more pixels may be stored, and between which the values may be shifted, and in which the Y scaling step for upsealing includes the steps of reading each pixel value into a cell, calculating the contributions for each pixel in the array using the filter function; summing the contributions (in a number corresponding to the filter width) for each target pixel; and shifting the source pixel values up one position, to read in a new source pixel and discard an old source pixel when the target boundary is crossed.

20. A parallel processing method of scaling a digital source image consisting of a matrix of X by Y pixels into a target image, comprising the steps of:

mapping the source pixels onto the target pixels;

scaling the source image in the X or Y direction in parallel to produce intermediate pixels that are scaled in one direction by determining contributions to each intermediate pixel using a digital filter and accumulating the contributions for each intermediate pixel, wherein each source pixel contributes to one or more intermediate pixels and each intermediate pixel receives contributions from one or more source pixels; and subsequently scaling the intermediate pixels in the other direction in parallel to produce target pixels by determining the contributions to each target pixel using the filter and accumulating the contributions for each target pixel;

wherein each intermediate pixel contributes to one or more target pixels and each target pixel receives contributions from one or more intermediate pixels, and in which a processing element (PE) array is used, in which interconnections allow data to be moved (swazzled) along the PE array, each PE including a number of addressable memory cells, in which values corresponding to one or more pixels may be stored, and between which the values may be shifted, and in which X scaling involves accumulating contributions in one accumulating PE per cluster, the contributions for each source pixels being swazzled across the PE array to their correct accumulating PE.

21. A parallel processing method of scaling a digital source image consisting of a matrix of X by Y pixels into a target image, comprising the steps of:

mapping the source pixels onto the target pixels;

scaling the source image in the X or Y direction in parallel to produce intermediate pixels that are scaled in one direction by determining contributions to each intermediate pixel using a digital filter and accumulating the contributions for each intermediate pixel, wherein each source pixel contributes to one or more intermediate pixels and each intermediate pixel receives contributions from one or more source pixels; and subsequently scaling the intermediate pixels in the other direction in parallel to produce target pixels by determining the contributions to each target pixel using the filter and accumulating the contributions for each target pixel;

wherein each intermediate pixel contributes to one or more target pixels and each target pixel receives contributions from one or more intermediate pixels, and in which a processing element (PE) array is used, in which interconnections allow data to be moved (swazzled) along the PE array, each PE including a number of addressable memory cells, in which values corresponding to one or more pixels may be stored, and between which the values may be shifted, and in which the method for the X scaling step for downscaling calculates the contributions for each source pixel; addresses them according to the distance they must travel and stores them in a memory cell array, then shifts each contribution in turn along the PE array to the correct accumulating PE.

22. A parallel processing method of scaling a digital source image consisting of a matrix of X by Y pixels into a target image, comprising the steps of:

mapping the source pixels onto the target pixels;

scaling the source image in the X or Y direction in parallel to produce intermediate pixels that are scaled in one direction by determining contributions to each intermediate pixel using a digital filter and accumulating the contributions for each intermediate pixel, wherein each source pixel contributes to one or more intermediate pixels and each intermediate pixel receives contributions from one or more source pixels; and subsequently scaling the intermediate pixels in the other direction in parallel to produce target pixels by determining the contributions to each target pixel using the filter and accumulating the contributions for each target pixel;

wherein each intermediate pixel contributes to one or more target pixels and each target pixel receives contributions from one or more intermediate pixels, and in which a processing element (PE) array is used, in which interconnections allow data to be moved (swazzled) along the PE array, each PE including a number of addressable memory cells, in which values corresponding to one or more pixels may be stored, and between which the values may be shifted, and in which the method for the X scaling step for upsealing involves loading the PE array with a repeating sequence of the source pixels in the corresponding cluster of the target pixels.

23. A method according to claim 22 in which the sequence is indexed to increase by one and restart each time a cluster boundary is crossed, the sequence restarting with the first pixel in the sequence and having a length equal to the filter width.

24. A method according to claim 22, in which the value loaded is held in one cell of the array of memory cells and the preferred swazzle movement moves the values one step at a time to fill a different cell with its value.

25. A parallel processing system for scaling a digital source image consisting of a matrix of X by Y pixels into a target image, comprising:

a processing element (PE) array, each PE including a number of addressable memory cells for storing values corresponding to one or more pixels;

a mapping tool for mapping the source pixels onto the target pixels;

a first parallel processing scaling tool for scaling the source image in the X or Y direction in parallel to produce intermediate pixels that are scaled in one direction;

a digital filter for determining contributions to each intermediate pixel;

an accumulator for accumulating the contributions for each intermediate pixel, wherein each source pixel contributes to one or more intermediate pixels and each intermediate pixel receives contributions from one or more source pixels;

shift means for shifting values in the memory cells during Y scaling such that they are shifted up the array one position when the process crosses a cluster boundary;

a second parallel processing scaling tool for scaling the intermediate pixels in the other direction in parallel by determining the contributions to each target pixel using the filter and accumulating the contributions for each target pixel; and means for moving data between PEs for X scaling, the data being swazzled a certain distance across a predetermined number of cluster boundaries until it reaches the correct PE for accumulation to make up target pixels, wherein each intermediate pixel contributes to one or more target pixels and each target pixel receives contributions from one or more intermediate pixels.

26. A parallel processing method of scaling a digital source image consisting of a matrix of X by Y pixels into a target image, comprising the steps of:

mapping the source pixels onto the target pixels;

scaling the source image in the X or Y direction in parallel using a processing element (PE) array, each PE including a number of addressable memory cells for storing values corresponding to one or more pixels, to produce intermediate pixels that are scaled in one direction by determining contributions to each intermediate pixel using a digital filter and accumulating the contributions for each intermediate pixel, wherein each source pixel contributes to one or more intermediate pixels and each intermediate pixel receives contributions from one or more source pixels; and subsequently scaling the intermediate pixels in the other direction in parallel to produce target pixels by determining the contributions to each target pixel using the filter and accumulating the contributions for each target pixel, and in which data is moved (swazzled) between PEs for X scaling, the data being swazzled a certain distance across a predetermined number of cluster boundaries until it reaches the correct PE for accumulation to make up target pixels;

wherein each intermediate pixel contributes to one or more target pixels and each target pixel receives contributions from one or more intermediate pixels.

27. A method according to claim 26, including the step of mapping a cluster of adjacent higher-resolution pixels onto each of the lower resolution pixels, in which a higher resolution pixel belongs to the cluster of a lower resolution pixel if its centre falls within that lower resolution pixel.

28. A method according to claim 27, including the step of calculating the distance from the cluster boundary as the source pixels are read in and defining process changes or increments to occur when the cluster border is crossed.

29. A method according to claim 26, including the step of calculating the distance between the centre of each higher resolution pixel and the centre of each lower resolution pixel to which it contributes or from which it receives contributions in the X and Y directions.

30. A method according to claim 26, in which integral filter function values for the filter function are determined for the X direction in an X preparation step.

31. A method according to claim 30, in which the X preparation step is performed prior to reading the pixel value data.

32. A method according to claim 26, in which the filter function for each lower resolution pixel is evaluated at any suitable number of points known as the filter footprint number, each point corresponding to a source pixel in downscaling or to a target pixel in upsealing; the filter footprint number being determined by the footprint of the filter function in source space or target space respectively.

33. A method according to claim 26, in which integration of the filter function is determined analytically, without approximation of the integration.

34. A method according to claim 26, in which in downscaling, (and in each direction) each source pixel contributes to a number of target pixels determined by the filter width and in upsealing (and in each direction) each target pixel receives contributions from a number of source pixels determined by the filter width.

35. A method according to claim 26 in which one PE is provided per pixel of the higher resolution image and the memory cell array is of the same length as the filter width.

36. A method according to claim 26 in which one PE is used per pixel of the lower resolution image and each PE processes two or more neighbouring higher resolution pixels which are read into the PE sequentially.

37. A method according to claim 26, in which a PE-pixel mapping is automatically selected according to process conditions.

38. A method according to claim 26, using SIMD processing on each line of source pixels.

39. A method according to claim 26, including the steps of reading the source image before scaling and analysing the source and target dimensions and writing the target pixels to external memory after scaling.

40. A computer program, algorithm or method of controlling a computer for use in SIMD processing to scale a digital source image consisting of a matrix of X by Y pixels into a target image using a method as defined in claim 26.

41. A computer program product comprising the program according to claim 26 loaded on a carrier, such as a CD or ROM memory or transported on a carrier wave.

* * * * *